United States Patent
Fujimoto

(10) Patent No.: US 10,726,360 B2
(45) Date of Patent: Jul. 28, 2020

(54) VEHICLE CONTROL SYSTEM, VEHICLE CONTROL METHOD, AND VEHICLE CONTROL PROGRAM

(71) Applicant: HONDA MOTOR CO., LTD, Minato-ku, Tokyo (JP)

(72) Inventor: Naotoshi Fujimoto, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 15/720,136

(22) Filed: Sep. 29, 2017

(65) Prior Publication Data

US 2018/0129981 A1 May 10, 2018

(30) Foreign Application Priority Data

Nov. 4, 2016 (JP) .................. 2016-216380

(51) Int. Cl.
| | |
|---|---|
| *G06K 9/00* | (2006.01) |
| *G01C 21/34* | (2006.01) |
| *G06Q 10/02* | (2012.01) |
| *G08G 1/0962* | (2006.01) |
| *G06F 21/00* | (2013.01) |
| *G05D 1/00* | (2006.01) |

(Continued)

(52) U.S. Cl.
CPC ......... *G06Q 10/02* (2013.01); *G01C 21/3438* (2013.01); *G05D 1/0088* (2013.01); *G05D 1/0223* (2013.01); *G06F 21/00* (2013.01); *G06K 9/00362* (2013.01); *G06K 9/00805* (2013.01); *G06K 9/00838* (2013.01); *G08G 1/0962* (2013.01); *G08G 1/123* (2013.01); *G05D 2201/0213* (2013.01)

(58) Field of Classification Search
CPC . G01C 21/3438; B60N 2/002; G06K 9/00838
See application file for complete search history.

(56) References Cited

U.S. PATENT DOCUMENTS 10,147,325 B1 * 12/2018 Copeland ............... G08G 1/202
2009/0240397 A1   9/2009 Schofield et al.
(Continued)

FOREIGN PATENT DOCUMENTS

CN    001470413    1/2004
CN    1746801      3/2006
(Continued)

OTHER PUBLICATIONS

Japanese Office Action for Japanese Patent Application No. 2016-216380 dated Sep. 4, 2018.
(Continued)

*Primary Examiner* — Ryan Rink
(74) *Attorney, Agent, or Firm* — Amin, Turocy & Watson, LLP

(57) ABSTRACT

A vehicle control system includes an output unit configured to output information to the outside of a vehicle, an in-vehicle status acquisition unit configured to acquire a status inside the vehicle, and a control unit configured to cause the output unit to output information as to whether or not it is possible to ride in the vehicle on the basis of in-vehicle information acquired by the in-vehicle status acquisition unit.

17 Claims, 13 Drawing Sheets

(51) Int. Cl.
*G05D 1/02* (2020.01)
*G08G 1/123* (2006.01)

(56) References Cited

U.S. PATENT DOCUMENTS

| | | | | |
|---|---|---|---|---|
| 2014/0104053 | A1* | 4/2014 | Clark, Jr. | B60R 16/02 340/457.1 |
| 2014/0125355 | A1* | 5/2014 | Grant | B64D 11/06 324/629 |
| 2015/0338852 | A1* | 11/2015 | Ramanujam | G01C 21/26 701/2 |
| 2016/0132164 | A1* | 5/2016 | Bowden | G06F 3/0484 715/753 |
| 2016/0171637 | A1* | 6/2016 | Rai | H04L 67/12 705/13 |
| 2016/0209845 | A1* | 7/2016 | Kojo | G01C 21/3407 |
| 2016/0301698 | A1* | 10/2016 | Katara | G07B 13/02 |
| 2017/0123423 | A1 | 5/2017 | Sako et al. | |
| 2017/0200082 | A1* | 7/2017 | Bohm | G06Q 10/06 |
| 2017/0316696 | A1* | 11/2017 | Bartel | G08G 1/202 |
| 2018/0039917 | A1* | 2/2018 | Buttolo | G01C 21/3438 |
| 2019/0236322 | A1* | 8/2019 | Arquero | B61D 41/04 |

FOREIGN PATENT DOCUMENTS

| | | |
|---|---|---|
| CN | 101383089 | 3/2009 |
| CN | 202080218 | 12/2011 |
| CN | 104392604 | 3/2015 |
| CN | 104580327 | 4/2015 |
| CN | 105564440 | 5/2016 |
| CN | 105599610 | 5/2016 |
| CN | 105752078 | 7/2016 |
| CN | 106080092 | 11/2016 |
| CN | 106197436 | 12/2016 |
| JP | 2000-285363 | 10/2000 |
| JP | 2003-044702 | 2/2003 |
| JP | 2003-271706 | 9/2003 |
| JP | 2004-102644 | 4/2004 |
| JP | 2007-293530 | 11/2007 |
| JP | 2009-211526 | 9/2009 |
| JP | 2009-289192 | 12/2009 |
| JP | 2012-014482 | 1/2012 |
| JP | 2016-126405 | 7/2016 |
| WO | 2015166811 A1 | 5/2015 |
| WO | 2015166811 A1 | 11/2015 |
| WO | 2016/008580 | 1/2016 |
| WO | WO-2018073606 A1 * | 4/2018 ............... B60N 5/00 |

OTHER PUBLICATIONS

Japanese Office Action for Japanese Patent Application No. 2016-216380 dated Jun. 5, 2018.

Japanese Office Action for Japanese Patent Application No. 2018-207884 dated Sep. 3, 2019.

* cited by examiner

VEHICLE CONTROL SYSTEM, VEHICLE CONTROL METHOD, AND VEHICLE CONTROL PROGRAM

CROSS-REFERENCE TO RELATED APPLICATION

Priority is claimed on Japanese Patent Application No. 2016-216380, filed Nov. 4, 2016, the content of which is incorporated herein by reference.

BACKGROUND OF THE INVENTION

Field of the Invention

The present invention relates to a vehicle control system, a vehicle control method, and a vehicle control program.

Description of Related Art

Recently, technology relating to car-sharing in which a single vehicle is shared by a plurality of people has been under research. A relevant technology in which a user who wishes to share a vehicle subscribes as a member of a car-sharing company and then can temporarily use a vehicle exclusively by using authentication information including an ID, a password, or the like issued by the car-sharing company has been disclosed (see, for example, PCT international Publication No. WO2015/166811).

SUMMARY OF THE INVENTION

However, according to the related-art technology, it is difficult to use a vehicle as a rideshare vehicle since each member individually uses a single vehicle. In addition, a person who wishes to share a ride sometimes cannot easily determine which vehicle he or she can share a ride in among vehicles that are running.

Aspects of the present invention have been made in view of the above circumstances and it is an object of the present invention to provide a vehicle control system, a vehicle control method, and a vehicle control program which can easily realize ridesharing of a vehicle.

In order to achieve the above object, the present invention adopts the following aspects.

(1) A vehicle control system according to an aspect of the present invention includes an output unit configured to output information to an outside of a vehicle, an in-vehicle status acquisition unit configured to acquire a status inside the vehicle, and a control unit configured to cause the output unit to output information as to whether or not it is possible to ride in the vehicle on the basis of in-vehicle information acquired by the in-vehicle status acquisition unit.

(2) In the above aspect (1), the control unit may be configured to acquire a number of riders as the in-vehicle information and to cause the output unit to output at least information regarding a number of people who can ride in the vehicle.

(3) In the above aspect (2), the control unit may be configured to cause the output unit to output, together with the information regarding the number of people who can ride in the vehicle, at least one of information regarding a travel plan of the vehicle or information regarding in-vehicle equipment or a male-to-female ratio of riders acquired by the in-vehicle status acquisition unit.

(4) In the above aspect (3), the information regarding the travel plan of the vehicle may include at least one of a destination of the vehicle or a waypoint on a route of travel to the destination.

(5) In any one of the above aspects (1) to (4), the control unit may be configured to cause the output unit to output information regarding a location at which a person is scheduled to be picked up by the vehicle.

(6) In any one of the above aspects (1) to (5), the control unit may be configured to cause the output unit to output information as to whether or not it is possible to ride in the vehicle when the vehicle is traveling within a predetermined section.

(7) In any one of the above aspects (1) to (6), the control unit may be configured to perform control as to whether or not to cause the output unit to output information as to whether or not it is possible to ride in the vehicle on the basis of a traveling speed of the vehicle.

(8) In the above aspect (3) or (4), the control unit may be configured to cause the output unit to output information regarding the travel plan of the vehicle when the vehicle is a foremost or rearmost vehicle performing a following travel.

(9) In any one of the above aspects (1) to (8), the vehicle control system may further include a recognition unit configured to recognize a person near the vehicle, and the control unit may be configured to control a display speed of the information as to whether or not it is possible to ride in the vehicle, which the output unit is caused to output, on the basis of a walking speed of the person recognized by the recognition unit.

(10) In the above aspect (9), the vehicle control system may further include a travel control unit configured to control traveling of the vehicle, and a determination unit configured to determine whether or not the person recognized by the recognition unit is a ride seeker, and the travel control unit may be configured to decrease a traveling speed of the vehicle when the determination unit has determined that the person recognized by the recognition unit is a ride seeker.

(11) In the above aspect (10), the determination unit may be configured to determine that the person recognized by the recognition unit is a ride seeker upon receiving, from a terminal device, a notification including information indicating that the person is a ride seeker.

(12) In the above aspect (10) or (11), the vehicle control system may further include an image capturing unit configured to capture an image around the vehicle, and the determination unit may be configured to analyze the image captured by the image capturing unit and to determine that the person recognized by the recognition unit is a ride seeker when a person included in the captured image is recognized as having raised a hand.

(13) In any one of the above aspects (10) to (12), the control unit may be configured to refuse riding of the person recognized by the recognition unit when the determination unit has determined that the person is ineligible for riding or when a rider of the vehicle has determined that the person is ineligible for riding.

(14) A vehicle control system according to an aspect of the present invention includes an output unit configured to output information to an outside of a vehicle, a control unit configured to cause the output unit to output information regarding a travel plan of the vehicle, and an automated driving control unit configured to perform automated driving of the vehicle.

(15) A vehicle control method according to an aspect of the present invention includes acquiring, by a vehicle-mounted computer, a status inside a vehicle, and causing an output unit to output information as to whether it is possible to ride in the vehicle to an outside of the vehicle on the basis of acquired in-vehicle information.

(16) A vehicle control program according to an aspect of the present invention causes a vehicle-mounted computer to acquire a status inside a vehicle, and cause an output unit to output information as to whether it is possible to ride in the vehicle to an outside of the vehicle on the basis of acquired in-vehicle information.

According to the above aspects (1), (15), and (16), the vehicle control system can easily realize ridesharing of a vehicle.

According to the above aspects (2) to (4), the vehicle control system can allow a person outside a vehicle to easily select the vehicle in which he or she wishes to ride.

According to the above aspect (5), the vehicle control system can guide a person outside a vehicle to a location at which he or she will be picked up. The vehicle control system can also notify the person that it is aware of his or her presence.

According to the above aspect (6), the vehicle control system can perform rideshare-related control within a predetermined section.

According to the above aspect (7), the vehicle control system can allow rideshare-related control not to be performed when the vehicle travels on an expressway or the like, thereby realizing safe travel.

According to the above aspect (8), the vehicle control system can allow riders of nearby vehicles to visually recognize the foremost and rearmost of a series of vehicles that are performing a following travel. Therefore, it is possible to realize appropriate driving of a vehicle when the vehicle is caused to travel behind the rearmost of the vehicles or caused to overtake the vehicles.

According to the above aspects (9) and (10), the vehicle control system can make it easy for pedestrians to visually recognize information output by the output unit.

According to the above aspect (11), the vehicle control system can easily determine that the person is a ride seeker by the notification from the terminal device.

According to the above aspect (12), the vehicle control system can easily determine that the person is a ride seeker by his or her action of raising a hand.

According to the above aspect (13), the vehicle control system can prevent an ineligible person from riding in the vehicle.

According to the above aspect (14), the vehicle control system can easily realize ridesharing of the vehicle in automated driving.

DETAILED DESCRIPTION OF THE INVENTION

First Embodiment

Hereinafter, a vehicle control system, a vehicle control method, and a vehicle control program according to a first embodiment will be described with reference to the drawings. In the first embodiment, it is assumed that the vehicle control system is applied to an automated driving vehicle. Automated driving means, for example, automatic control of at least one of acceleration/deceleration or steering of a vehicle to drive the vehicle.

[Overall Configuration]

Figure 1:
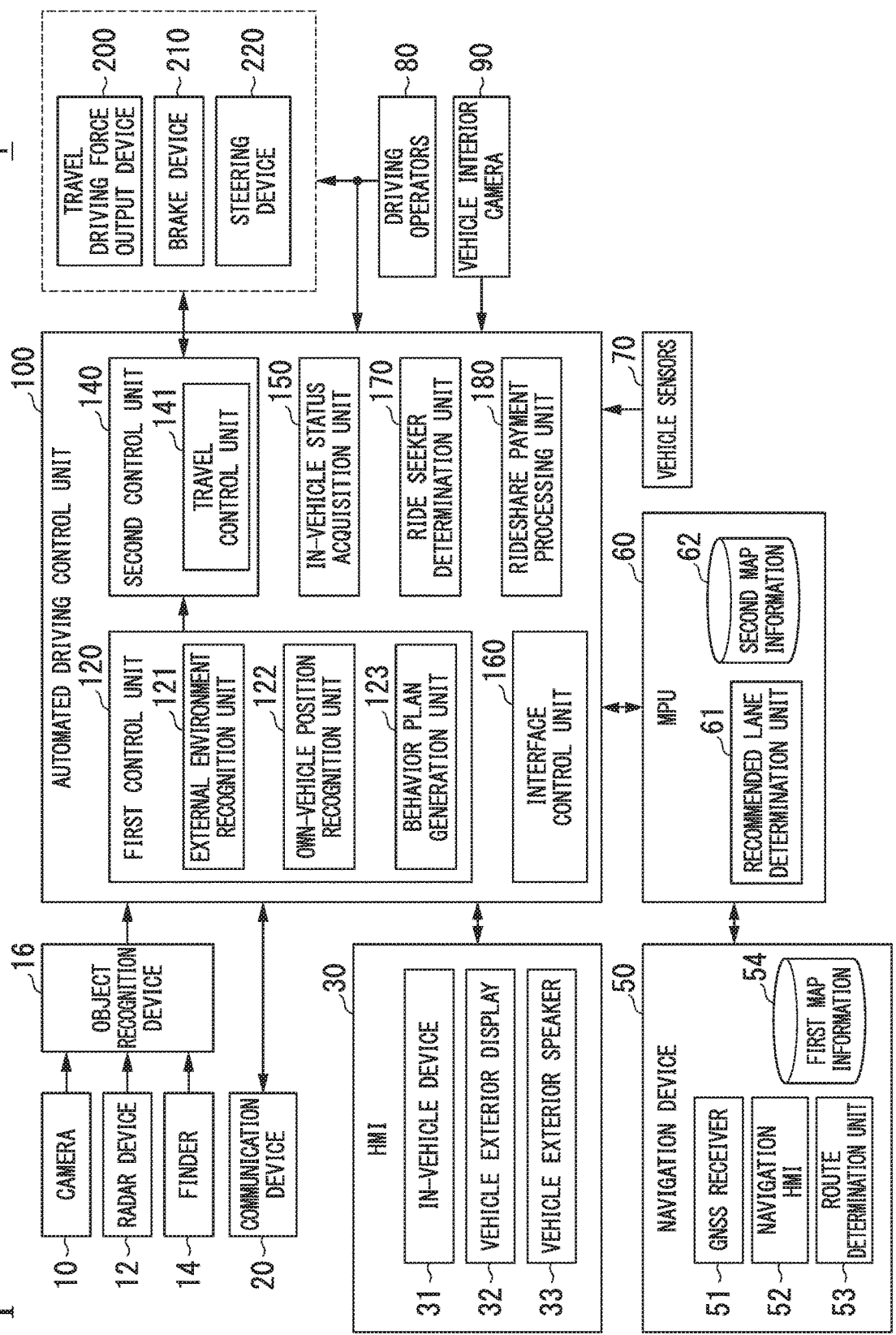
FIG. 1 is a configuration diagram of a vehicle system 1 according to a first embodiment.

FIG. 1 is a configuration diagram of a vehicle system 1 according to the first embodiment. A vehicle on which the vehicle system 1 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera (an image capturing unit) 10, a radar device 12, a finder 14, an object recognition device 16, a communication device 20, a human machine interface (HMI) 30, a navigation device 50, a micro-processing unit (MPU) 60, vehicle sensors 70, driving operators 80, a vehicle interior camera 90, an automated driving control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. Note that the components shown in FIG. 1 are merely an example and some of the components may be omitted or other components may be added.

In the first embodiment, the "vehicle control system" includes, for example, the HMI 30 and the automated driving control unit 100. The HMI 30 is an example of an "output unit." An interface control unit 160 is an example of a "control unit." An external environment recognition unit 121 is an example of a "recognition unit." A ride seeker determination unit 170 is an example of a "determination unit." A combination of a first control unit 120 and a second control unit 140 is an example of the "automated driving control unit."

The camera 10 is, for example, a digital camera using a solid-state imaging device such as a charge coupled device (CCD) or complementary metal oxide semiconductor (CMOS) image sensor. One or a plurality of cameras 10 may be attached to the vehicle M, on which the vehicle system 1 is mounted, at arbitrary locations thereof. For imaging the area in front of the vehicle, a camera 10 is attached to an upper portion of a front windshield, a rear surface of a rearview mirror, or the like. For imaging the area behind the vehicle, a camera 10 is attached to an upper portion of a rear windshield, a back door, or the like. For imaging the area to the side of the vehicle, a camera 10 is attached to a door mirror or the like. For example, the camera 10 repeats imaging of the periphery of the vehicle M at regular intervals. The camera 10 may also be a stereo camera.

The radar device 12 radiates radio waves such as millimeter waves around the vehicle M and detects (reflected) radio waves reflected by an object to detect at least the position (distance and orientation) of the object. One or a plurality of radar devices 12 may be attached to the vehicle M at arbitrary locations thereof. The radar device 12 may detect the position and velocity of an object using a frequency modulated continuous wave (FMCW) method.

The finder 14 is a light detection and ranging or laser imaging detection and ranging (LIDAR) finder which measures scattered light from an object in response to illuminated light to detect the distance to the object. One or a plurality of finders 14 may be attached to the vehicle M at arbitrary locations thereof.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100.

For example, the communication device 20 communicates with other vehicles present around the vehicle M using a cellular network, a Wi-Fi network, Bluetooth (registered trademark), dedicated short range communication (DSRC) or the like or communicates with various server devices via wireless base stations. The communication device 20 also communicates with a terminal device held by a person outside the vehicle.

The HMI 30 presents various types of information to a rider in the vehicle and receives an input operation from the rider. The HMI 30 includes, for example, an in-vehicle device 31. The in-vehicle device 31 is, for example, any of various display devices, a touch panel, a speaker, a microphone, a buzzer, a switch, a key, or the like.

The HMI 30 also presents information to the outside of the vehicle. In this case, the HMI 30 includes, for example, a vehicle exterior display 32, a vehicle exterior speaker 33, or the like.

The vehicle exterior speaker 33 outputs a sound in a predetermined range outside the vehicle. The vehicle exterior speaker 33 may also output a sound having directivity in a predetermined direction.

The navigation device 50 includes, for example, a global navigation satellite system (GNSS) receiver 51, a navigation HMI 52, and a route determination unit 53 and holds first map information 54 in a storage device such as a hard disk drive (HDD) or a flash memory. The GNSS receiver specifies the position of the vehicle M on the basis of signals received from GNSS satellites. The position of the vehicle M may also be specified or supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determination unit 53 determines a route from the position of the vehicle M specified by the GNSS receiver 51 (or an arbitrary input position) to a destination input by the rider using the navigation HMI 52 (for example, a route including information regarding waypoints on the route of travel to the destination) by referring to the first map information 54. The first map information 54 is, for example, information representing shapes of roads by links indicating roads and nodes connected by the links. The first map information 54 may include curvatures of roads, point of interest (POI) information, or the like. The route determined by the route determination unit 53 is output to the MPU 60. The navigation device 50 may also perform route guidance using the navigation HMI 52 on the basis of the route determined by the route determination unit 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determination unit 61 and holds the second map information 62 in a storage device such as an HDD or a flash memory. The recommended lane determination unit 61 divides the route provided from the navigation device 50 into a plurality of blocks (for example, into blocks each 100 meters long in the direction in which the vehicle travels) and determines a recommended lane for each block by referring to the second map information 62. The recommended lane determination unit 61 determines the recommended lane such that the recommended lane is given a position in a lane order counted from the leftmost lane. When there is a branch point, a merge point, or the like on the route, the recommended lane determination unit 61 determines a recommended lane such that the vehicle M can travel on a reasonable travel route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, regions of emergency parking zones, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include a vehicle speed sensor that detects the speed of the vehicle M, an acceleration sensor that detects the acceleration thereof, a yaw rate sensor that detects an angular speed thereof about the vertical axis, an orientation sensor that detects the orientation of the vehicle M, or the like.

The driving operators 80 include, for example, an accelerator pedal, a brake pedal, a shift lever, a steering wheel, and other operators. A sensor for detecting the amount of operation or the presence or absence of operation is attached to each of the driving operators 80 and detection results thereof are output to either or both of the automated driving control unit 100 or the travel driving force output, brake, and steering devices 200, 210, and 220.

The vehicle interior camera 90 captures an image of the upper body around the face of a rider sitting on a driver's seat. The captured image of the vehicle interior camera 90 is output to the automated driving control unit 100.

[Automated Driving Control Unit]

The automated driving control unit 100 includes, for example, a first control unit 120, a second control unit 140, an in-vehicle status acquisition unit 150, an interface control unit 160, a ride seeker determination unit 170, and a rideshare payment processing unit 180. Each of the first control unit 120, the second control unit 140, the in-vehicle status acquisition unit 150, the interface control unit 160, the ride seeker determination unit 170, and the rideshare payment processing unit 180 is realized by a processor such as a central processing unit (CPU) executing a program (software). Some or all of the respective functional units of the first control unit 120, the second control unit 140, the in-vehicle status acquisition unit 150, the interface control unit 160, the ride seeker determination unit 170, and the rideshare payment processing unit 180 may be realized by hardware such as a large scale integration (LSI), an application specific integrated circuit (ASIC), or a field-programmable gate array (FPGA) or may be realized by cooperation of hardware and software.

The first control unit 120 includes, for example, an external environment recognition unit 121, an own-vehicle position recognition unit 122, and a behavior plan generation unit 123.

The external environment recognition unit 121 recognizes states of a nearby vehicle(s) such as the position, speed and acceleration thereof on the basis of information input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include acceleration or jerk of the nearby vehicle or a "behavior state" (for example, whether or not the nearby vehicle is changing or is going to change lanes).

The external environment recognition unit 121 may also recognize the positions of guardrails or utility poles, parked vehicles, people such as pedestrians, and other objects in addition to nearby vehicles.

The own-vehicle position recognition unit 122 recognizes, for example, a (traveling) lane on which the vehicle M is traveling and the relative position and attitude of the vehicle M with respect to the traveling lane. The own-vehicle position recognition unit 122 recognizes the traveling lane, for example, by comparing a pattern of road lane lines (for example, an arrangement of solid and broken lines) obtained from the second map information 62 with a pattern of road lane lines near the vehicle M recognized from an image captured by the camera 10. This recognition may be performed taking into consideration a position of the vehicle M acquired from the navigation device 50 or a result of processing by the INS.

Figure 2:
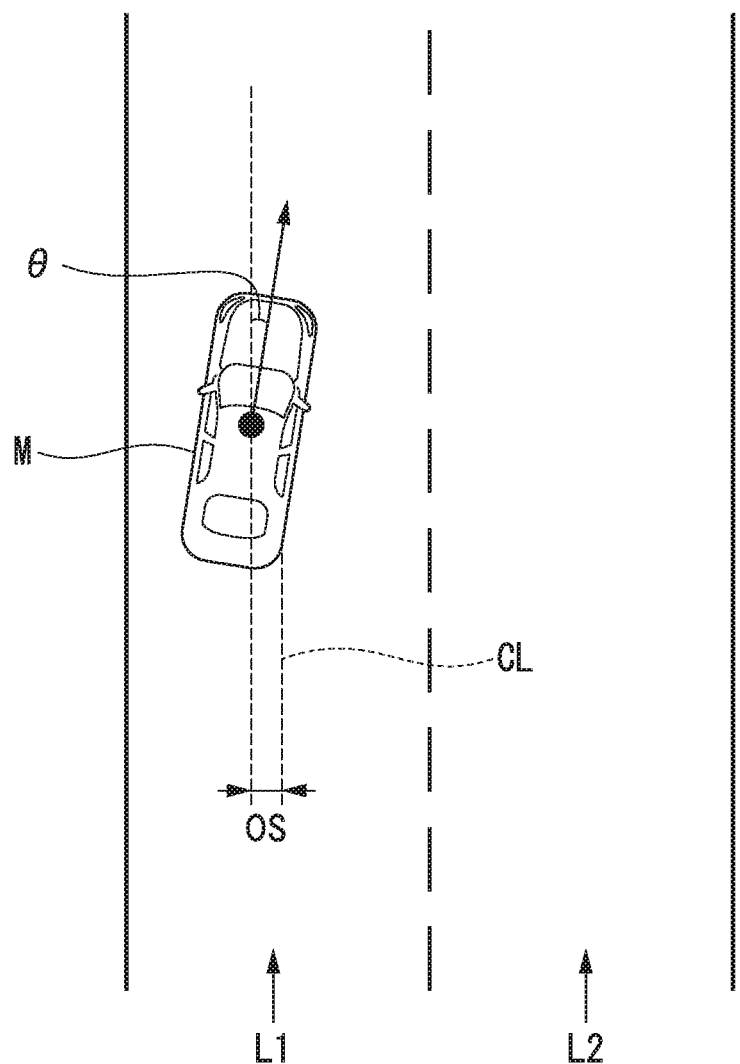
FIG. 2 is a diagram showing how the relative position and attitude of a vehicle M with respect to a traveling lane L1 are recognized by an own-vehicle position recognition unit 122.

Then, the own-vehicle position recognition unit 122 recognizes, for example, the relative position or attitude of the vehicle M with respect to the traveling lane. FIG. 2 is a diagram showing how the relative position and attitude of the vehicle M with respect to the traveling lane L1 are recognized by the own-vehicle position recognition unit 122. For example, the own-vehicle position recognition unit 122 recognizes both a deviation OS, from a traveling lane center CL, of a reference point (for example, the center of gravity) of the vehicle M and an angle θ formed by the travel direction of the vehicle M relative to an extension line of the traveling lane center CL as the relative position and attitude of the vehicle M with respect to the traveling lane L1. Alternatively, the own-vehicle position recognition unit 122 may recognize, for example, the position of the reference point of the vehicle M with respect to one of the sides of the traveling lane L1 or the like as the relative position of the vehicle M with respect to the traveling lane. The relative position of the vehicle M recognized by the own-vehicle position recognition unit 122 is provided to the recommended lane determination unit 61 and the behavior plan generation unit 123.

The behavior plan generation unit 123 generates a behavior plan for the vehicle M to perform automated driving to the destination or the like. For example, the behavior plan generation unit 123 determines events which are to be sequentially performed in the automated driving control such that the vehicle M travels in the recommended lane determined by the recommended lane determination unit 61 and copes with situations occurring nearby the vehicle M. Events in the automated driving of the first embodiment include, for example, a constant-speed travel event which is an event of traveling in the same traveling lane at a constant speed, a lane change event which is an event of changing the traveling lane of the vehicle M, an overtaking event which is an event of overtaking a preceding vehicle, following travel event which is an event of traveling behind a preceding vehicle, a merging event that is an event of causing the vehicle to merge at a merge point, a branching event which is an event of causing the vehicle M to travel in a target direction at a branch point of the road, an emergency stop event which is an event of causing the vehicle M to make an emergency stop, and a handover event which is an event of terminating automated driving and switching to manual driving. During execution of these events, behaviors for avoidance may sometimes be planned on the basis of situations occurring nearby the vehicle M (such as the presence of nearby vehicles and pedestrians or lane narrowing due to road construction).

The behavior plan generation unit 123 generates a target trajectory along which the vehicle M will travel in the future. The target trajectory includes, for example, velocity components. For example, the target trajectory is generated as a set of target points (trajectory points) to be reached at a plurality of future reference times which are set at intervals of a predetermined sampling time (for example, about tenths of a second). Therefore, when the distance between trajectory points is great, this means that the vehicle travels at a high speed in the section between the trajectory points.

Figure 3:
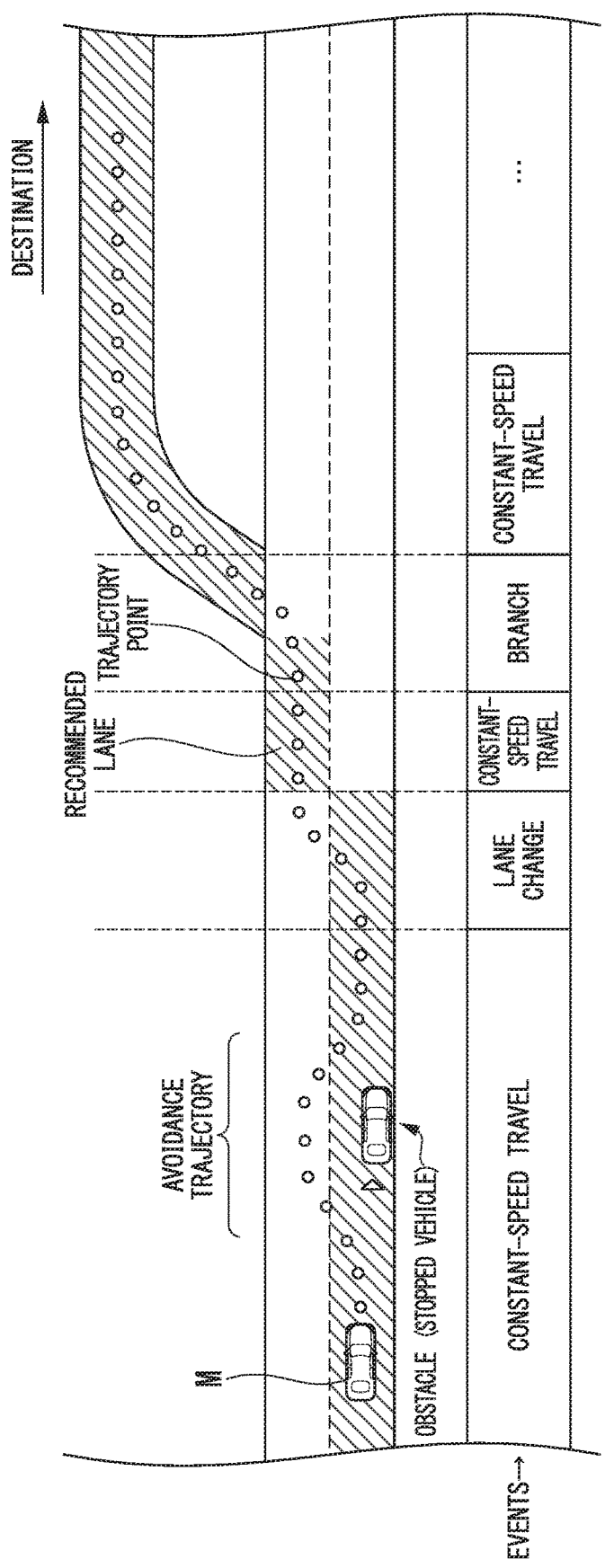
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination.

When the vehicle M approaches a predetermined distance (which may be determined according to the types of events) before a point for switching to the recommended lane, the behavior plan generation unit 123 activates a lane change event, a branching event, a merging event, or the like. When it becomes necessary to avoid an obstacle during execution of each event, an avoidance trajectory is generated as shown in FIG. 3.

For example, the behavior plan generation unit 123 generates a plurality of candidate target trajectories and selects an optimum target trajectory that is suitable for the route to the destination at that point in view of safety and efficiency. The behavior plan generation unit 123 also generates the target trajectory, for example, in consideration of processing results of the in-vehicle status acquisition unit 150, the interface control unit 160, the ride seeker determination unit 170, and the like.

This will be described later.

The second control unit 140 includes, for example, a travel control unit 141. The travel control unit 141 controls the travel driving force output device 200, the brake device 210, and the steering device 220 such that the vehicle M passes through the target trajectory generated by the behavior plan generation unit 123 at scheduled times.

The travel driving force output device 200 outputs a travel driving force (torque) required for the vehicle to travel to driving wheels. The travel driving force output device 200 includes, for example, a combination of an internal combustion engine, an electric motor, a transmission, and the like and an electronic control unit (ECU) that controls them. The ECU controls the above constituent parts according to information input from the travel control unit 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel control unit 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. Note that the brake device 210 is not limited to that configured as described above and may be an electronically controlled hydraulic brake device that controls an actuator according to information input from the travel control unit 141 or information input from the driving operators 80 and transmits the hydraulic pressure of the master cylinder to the cylinder. The brake device 210 may also include a plurality of brake systems in consideration of safety.

The steering device 220 includes, for example, a steering ECU and an electric motor.

The electric motor, for example, applies a force to a rack-and-pinion mechanism to change the direction of steerable wheels. The steering ECU drives the electric motor according to information input from the travel control unit 141 or information input from the driving operators 80 to change the direction of the steerable wheels.

[Vehicle Control for Picking Up Ride Seeker]

Hereinafter, vehicle control for picking up a ride seeker in the first embodiment will be described. For example, the vehicle M of the first embodiment outputs information to the outside of the vehicle by interface control which will be described later on the basis of in-vehicle states and predetermined conditions. In addition, upon determining that a person outside the vehicle M is a ride seeker, the vehicle M of the first embodiment determines whether or not the ride seeker is a person ineligible for riding and performs stop control for picking up the ride seeker upon determining that the ride seeker is not ineligible for riding. Further, the vehicle M of the first embodiment performs a rideshare payment process when a rider who has shared a ride is dropped off.

[In-Vehicle Status]

Figure 4:
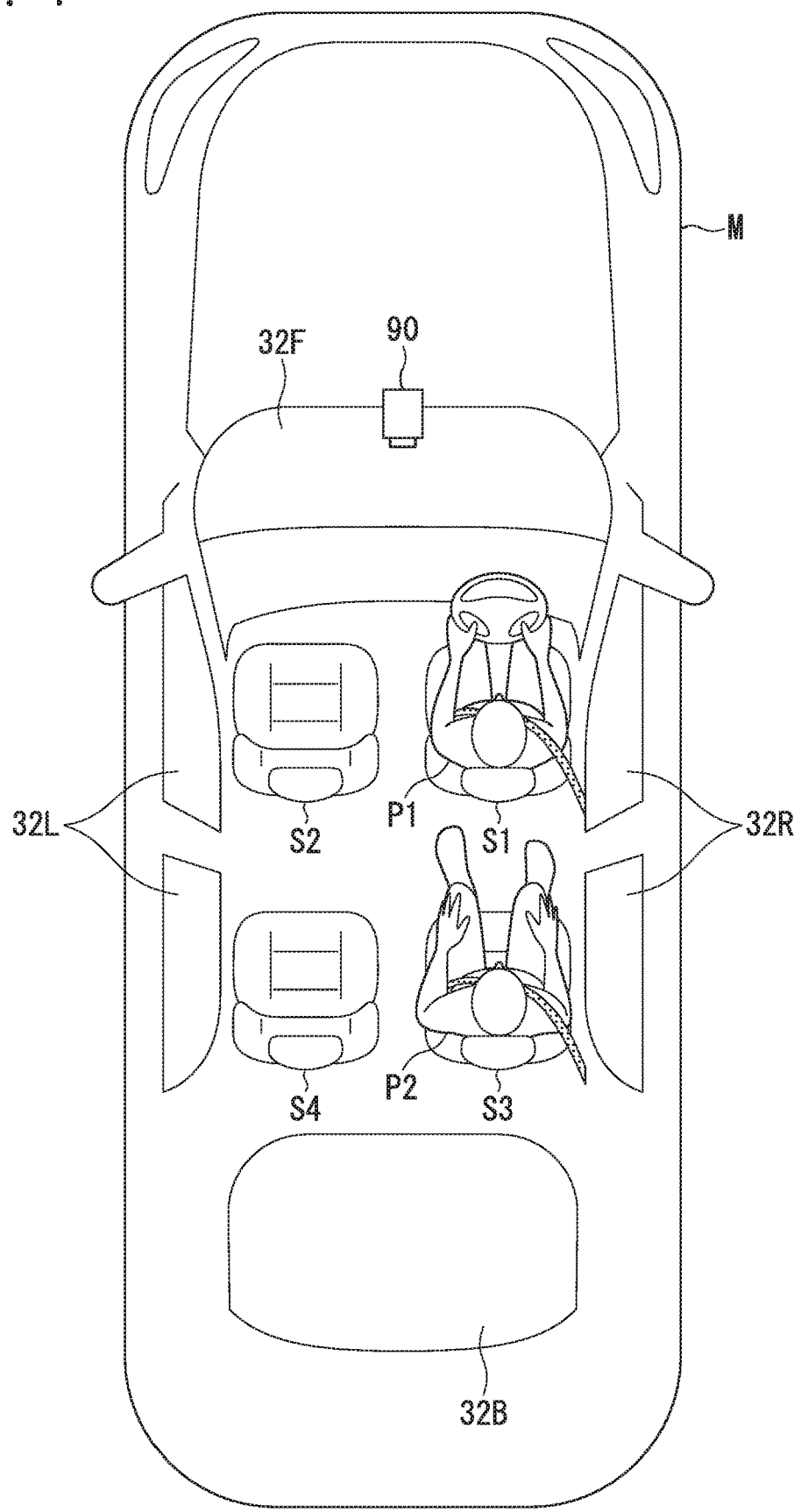
FIG. 4 is a diagram illustrating processing by an in-vehicle status acquisition unit 150.

The in-vehicle status acquisition unit 150 acquires a status inside the vehicle M or in-vehicle information. FIG. 4 is a diagram illustrating processing by the in-vehicle status acquisition unit 150. In the example of FIG. 4, the vehicle M includes a vehicle exterior display 32, a vehicle interior camera 90, and seats S. The vehicle exterior display 32 includes, for example, a front display 32F, a right-side display 32R, a left-side display 32L, and a rear display 32B of the vehicle M.

The front display 32F is, for example, a light transmissive liquid crystal panel formed on at least a part of the front windshield. The front display 32F secures forward visibility for the driver and displays an image which is visible to a person in front of the vehicle. Similar to the front display 32F, each of the right-side display 32R, the left-side display 32L, and the rear display 32B is a light transmissive liquid crystal panel formed on at least a part of the glass provided in the corresponding side. The right-side display 32R and the left-side display 32L are formed on side windows of the rear seats in the vehicle M, but the present invention is not limited to this and they may be formed on side windows of the front seats or may be formed on those of both the front and rear seats.

The vehicle exterior display 32 is provided on at least a part of the glass of the vehicle M as described above. However, alternatively (or additionally), a vehicle exterior display 32 may be provided on a body portion outside the vehicle M.

Further, in the example of FIG. 4, it is assumed that the vehicle interior camera 90 is provided at a position at which it can capture images of some or all of the seats S1 to S4 provided in the vehicle M on which riders sit. In the following description, for the sake of convenience, it is also assumed that the position, the angle of view, or the like of the vehicle interior camera 90 are fixed. Therefore, the in-vehicle status acquisition unit 150 can determine in advance which seat of the vehicle M is imaged at a position (coordinates) in the captured image of the vehicle interior camera 90.

The in-vehicle status acquisition unit 150 acquires an image captured by the vehicle interior camera 90, analyzes the acquired captured image, and determines which seats riders are sitting on among the seats S1 to S4 in the vehicle M. For example, the in-vehicle status acquisition unit 150 determines whether or not a facial region including facial feature information (of, for example, eyes, a nose, a mouth, or a face contour) is present in the captured image. Upon determining that a facial region is present, the in-vehicle status acquisition unit 150 determines which seat a rider is sitting on among the seats S1 to S4 on the basis of the position (a center position) of the facial region in the captured image.

In the case in which a load sensor is provided on each of the seats S1 to S4, the in-vehicle status acquisition unit 150 determines that a rider is sitting on a seat when a load value from the corresponding load sensor is equal to or more than a threshold value.

Further, the in-vehicle status acquisition unit 150 analyzes the hair style, the clothes, the shape or color of the face, or the like of the rider sitting on the seat from the captured image of the vehicle interior camera 90 and estimates the gender of the rider on the basis of the analysis result. For example, the in-vehicle status acquisition unit 150 determines that the rider is a female when the rider's hair is long and the color of his/her lips is red. In addition, the in-vehicle status acquisition unit 150 may receive inputs of information regarding the genders of riders using the in-vehicle device 31 when they get in the vehicle. For example, the in-vehicle status acquisition unit 150 may acquire the male-to-female ratio of the riders on the basis of the acquired information regarding on the genders of the riders. In the example of FIG. 4, the ratio of male to female is 1:1 when a rider P1 is male and a rider P2 is female.

Then, the in-vehicle status acquisition unit 150 calculates the remaining number of people who can ride in the vehicle M on the basis of the total number of seats S1 to S4 and the number of seats on which the riders are sitting (i.e., the number of riders). In the example of FIG. 4, the in-vehicle status acquisition unit 150 determines that the riders P1 and P2 are sitting on the seats S1 and S3 among the seats S1 to S4. The in-vehicle status acquisition unit 150 determines that the remaining number of people who can ride in the vehicle M is two because the riders are sitting on two seats out of all four.

Further, the in-vehicle status acquisition unit 150 acquires information regarding in-vehicle equipment which is set in the vehicle M. The information regarding in-vehicle equipment is, for example, information as to whether or not a charging facility for charging the terminal device is provided and whether or not humidifying equipment for humidifying the inside of the vehicle is provided. For example, the information regarding in-vehicle equipment may be held in a storage device such as an HDD or a flash memory (not shown) in the automated driving control unit 100. For example, the information regarding in-vehicle equipment may be preset at the time of factory shipment or may be updated when the equipment is attached to or removed from the vehicle M.

[Interface Control]

The interface control unit 160 outputs information to the outside of the vehicle using at least one of the vehicle exterior display 32 or the vehicle exterior speaker 33. The information is, for example, content such as an image displayed on the vehicle exterior display 32 or a sound output from the vehicle exterior speaker 33. The content presents, for example, information for collecting riders.

The information presented by the content is, for example, in-vehicle information obtained from the in-vehicle status acquisition unit 150. For example, the information presented by the content is information as to whether or not it is possible to ride in the vehicle M. The information presented by the content may also be information regarding the number of people who can ride in the vehicle M. Further, the information presented by the content may be information regarding in-vehicle equipment, the male-to-female ratio of riders, or the like acquired by the in-vehicle status acquisition unit 150.

Furthermore, the information presented by the content may be information regarding a travel plan of the vehicle M.

The information regarding the travel plan of the vehicle M includes, for example, at least one of a destination or a waypoint(s) of the vehicle M. By outputting the waypoint, it is possible to allow people who are headed to the same location along the route to take a shared ride. The interface control unit 160 may also appropriately combine and output any of the pieces of information presented by the content described above to the outside of the vehicle.

Figure 5:
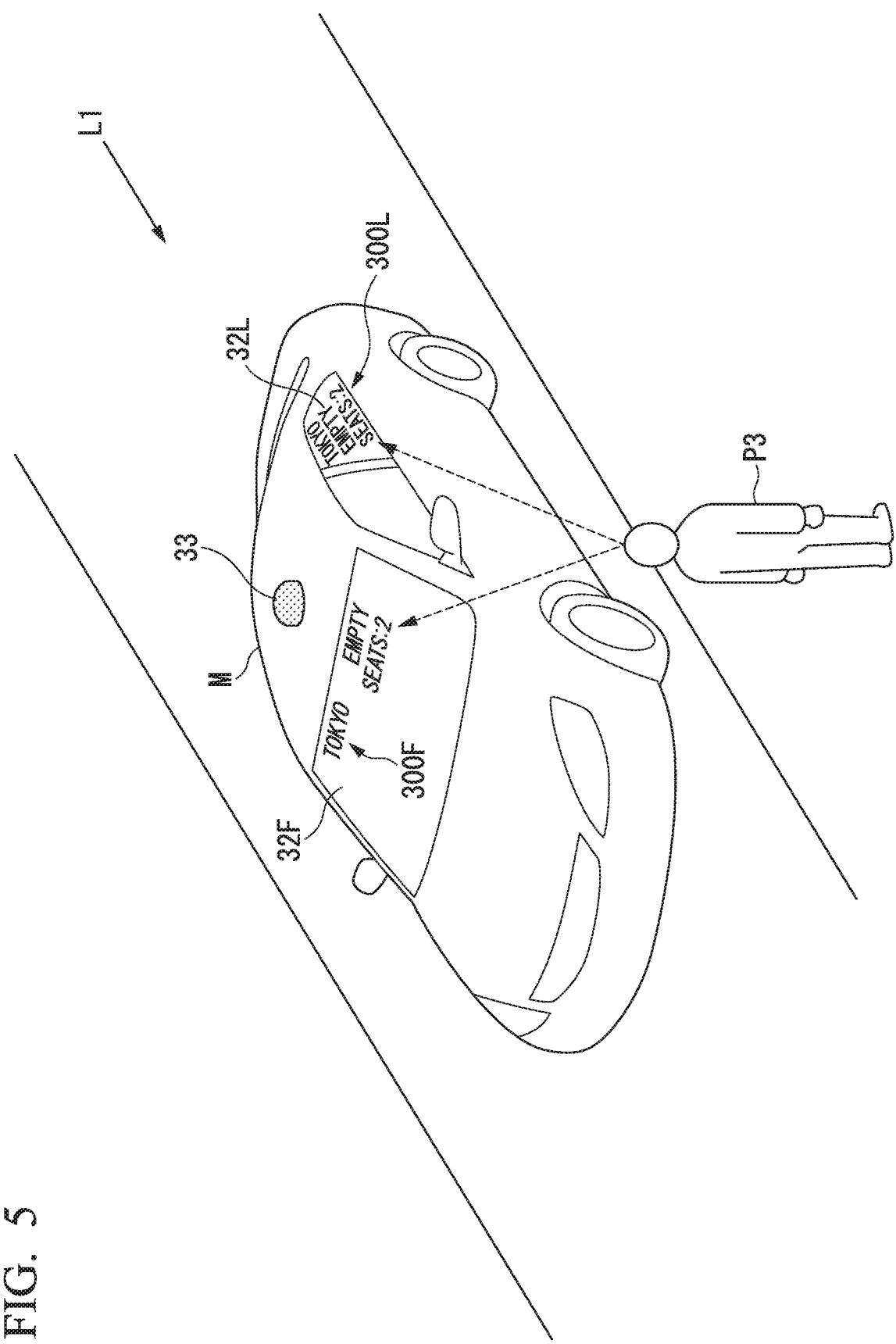
FIG. 5 is a diagram showing an example of content that is output to the outside of the vehicle.

FIG. 5 is a diagram showing an example of content that is output to the outside of the vehicle. When a person P3 is recognized by the external environment recognition unit 121, the interface control unit 160 outputs content using vehicle exterior displays 32 which are seen from the position of the person P3. In the example of FIG. 5, images 300F and 300L regarding the destination and the number of people who can ride in the vehicle M are displayed respectively on the front display 32F and the left-side display 32L of the vehicle M traveling in a traveling lane L1. The interface control unit 160 may cause the images 300F and 300L to blink or may display the images 300F and 300L in colors which are different during day and night.

In addition, the interface control unit 160 outputs a sound having the same content as information shown by the image 300L using the vehicle exterior speaker 33. The interface control unit 160 may also output music or alarms such as those which attract the attention of those nearby using the vehicle exterior speaker 33.

Further, the interface control unit 160 may cause character strings shown by the images 300F and 300L to be displayed moving sequentially from beginning characters.

Figure 6:
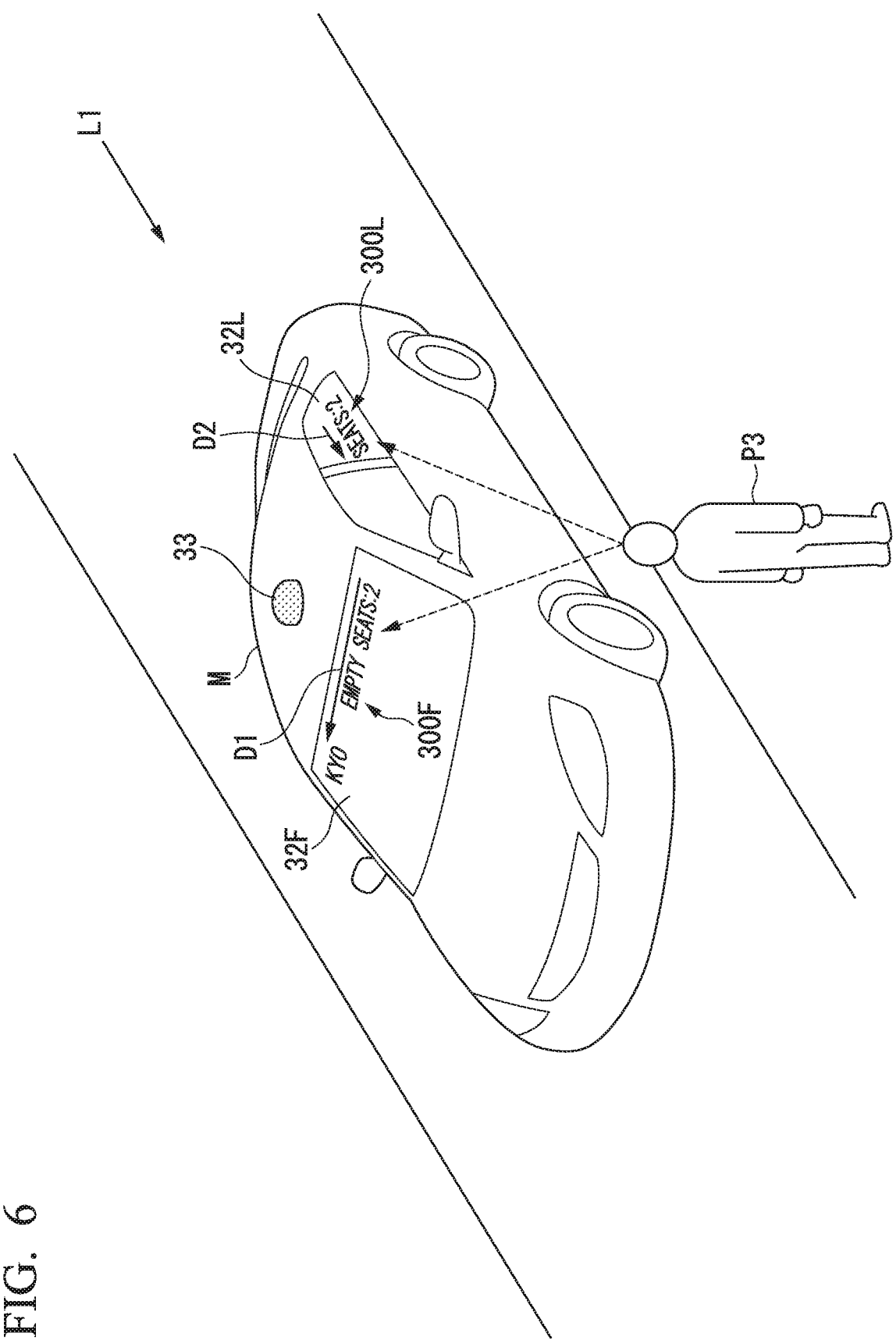
FIG. 6 is a diagram showing an example of movement of character strings shown by images 300F and 300L.

FIG. 6 is a diagram showing an example of movement of character strings shown by images 300F and 300L.

In the example of FIG. 6, the interface control unit 160 causes the image 300F displayed on the front display 32F to move in a direction of arrow D1 and causes the image 300L displayed on the left-side display 32L to move in a direction of arrow D2. The interface control unit 160 causes the images 300F and 300L to be repeatedly displayed.

The interface control unit 160 controls the movement direction or the display speed of the images 300F and 300L on the basis of the walking direction or speed of the person recognized by the external environment recognition unit 121.

For example, when displaying the image 300L using the left-side display 32L, the interface control unit 160 displays the image 300L while moving the image 300L in a direction opposite to the walking direction of the person P3. It is preferable that the speed of moving the display of the image 300L be the same as the walking speed of the person P3. Thereby, the interface control unit 160 makes it easy for the person P3 to visually recognize the image 300L. The person P3 can also recognize that the vehicle M is aware of his or her presence.

Further, when outputting the images 300F and 300L to the person P3, the interface control unit 160 may instruct the behavior plan generation unit 123 to cause the vehicle M to decrease the traveling speed on the basis of the traveling speed of the person P3. For example, the interface control unit 160 causes the vehicle M to travel at a speed that is the same as or approximate to the traveling speed of the person P3 to make it easy for the person P3 to visually recognize the images 300F and 300L.

Further, when a plurality of persons are recognized by the external environment recognition unit 121, the interface control unit 160 causes the vehicle exterior display 32 to output, for example, an image 300 for a person first recognized. The interface control unit 160 may also cause the vehicle exterior display 32 to output an image 300 for a person closest to the vehicle M.

[Predetermined Conditions]

Predetermined conditions for outputting content to the outside of the vehicle are conditions on, for example, (1) a traveling position of the vehicle M, (2) a traveling speed of the vehicle M, (3) a motion of a person outside the vehicle, (4) and the number of people who can ride in the vehicle M. When all the set conditions are satisfied, the interface control unit 160 outputs content to the outside of the vehicle. Hereinafter, each of the condition-related factors (1) to (4) will be specifically described.

(1) Traveling Position of Vehicle M

The interface control unit 160 outputs content to the outside of the vehicle, for example, when the vehicle M is traveling within a predetermined section on the basis of position information of the vehicle M recognized by the own-vehicle position recognition unit 122. The section may be set at the time of factory shipment or may be set by a rider or the like. Further, a setting-prohibited section such as an expressway may be set in the settings of the section.

(2) Traveling Speed of Vehicle M

The interface control unit 160 outputs content to the outside of the vehicle, for example, when the traveling speed of the vehicle M is equal to or less than a threshold value. The threshold value may be preset for each road or may be set by a rider. Thus, for example, the interface control unit 160 can suppress the output of content to the outside of the vehicle in a situation such as on an expressway where it is not possible to pick up a person. In addition, a person outside the vehicle can easily read content output by a vehicle traveling at a low speed. By outputting content when the vehicle M is traveling at a low speed, it is possible to smoothly stop the vehicle M when picking up a ride seeker.

(3) Motion of Person Outside Vehicle

For example, the interface control unit 160 may output content to the outside of the vehicle upon estimating that a person outside the vehicle has raised his or her hand. For example, the interface control unit 160 analyzes an image captured by the camera 10 and estimates whether or not a person has raised his or her hand through pattern matching between a contour shape of the person included in the captured image and a preset contour shape of a person who has raised his or her hand. This allows the interface control unit 160 to output content to a person who is highly likely to be a ride seeker.

(4) Number of People Who can Ride in Vehicle M

For example, the interface control unit 160 may output content to the outside of the vehicle when the number of people who can ride in the vehicle M is one or more. This allows the interface control unit 160 to suppress the output of content at the time of full occupancy.

In addition to the above factors (1) to (4), the interface control unit 160 may ask a rider of the vehicle M whether or not he or she permits content to be output to the outside of the vehicle using the in-vehicle device 31 of the HMI 30 and may output the content to the outside of the vehicle when an input permitting the output of content is received from rider. This allows the interface control unit 160, for example, to prevent the output of content for collecting rideshares in response to a request of a rider who does not wish to share a ride.

[Identification of Ride Seeker]

Figure 7:
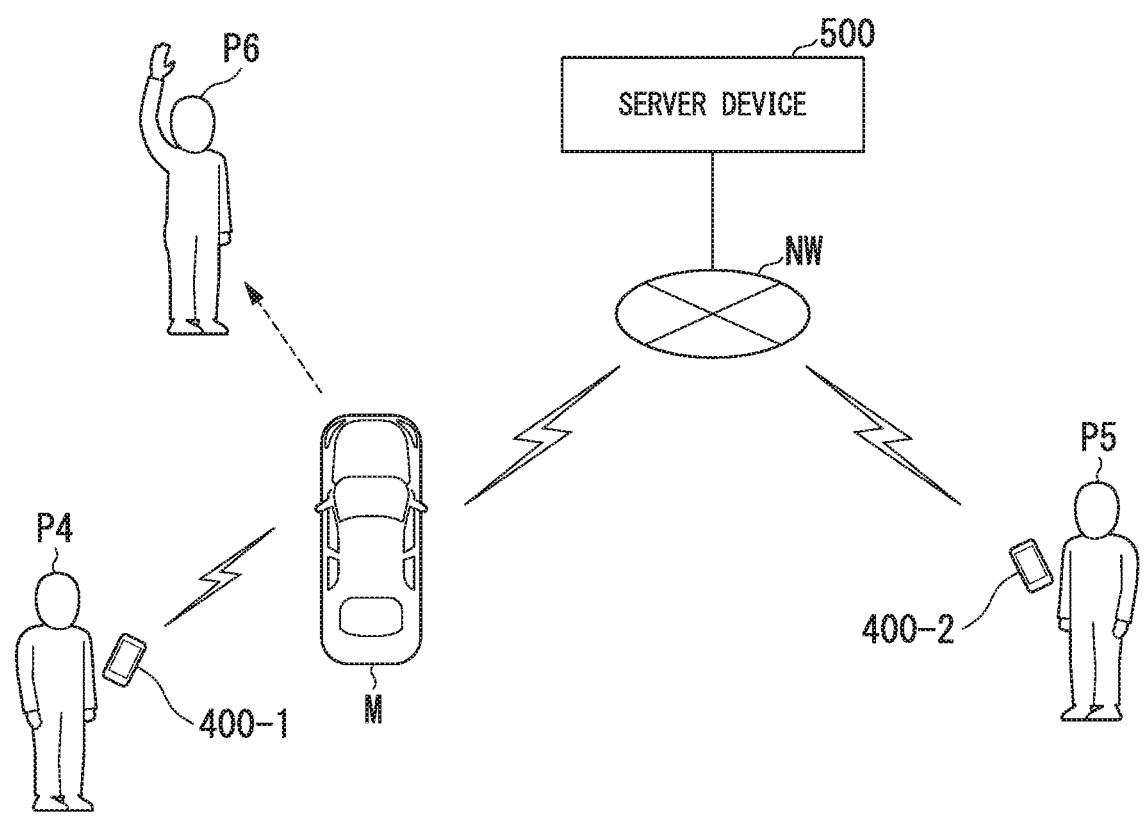
FIG. 7 is a diagram illustrating how a ride seeker is identified by a ride seeker determination unit 170.

When content is being output to the outside of the vehicle by the interface control unit 160, the ride seeker determination unit 170 determines whether or not a person recognized by the external environment recognition unit 121 is a ride seeker. FIG. 7 is a diagram illustrating how a ride seeker is identified by the ride seeker determination unit 170. A vehicle M, persons P4 to P6, terminal devices 400-1 and 400-2 held by the person P4 and P5 (hereinafter referred to simply as "terminal devices 400" unless otherwise distinguished), and a server device 500 are shown in the example of FIG. 7. The vehicle M, the terminal devices 400, and the server device 500 communicate with each other via a network NW. The network NW is, for example, a wide area network (WAN), a local area network (LAN), or the like.

Each of the terminal devices 400 is, for example, a smartphone or a tablet terminal. The terminal device 400 has a function of communicating with the vehicle M present around the terminal device 400 using a cellular network, a Wi-Fi network, Bluetooth, DSRC or the like or communicating with the server device 500 via a wireless base station.

The server device 500 manages traveling positions, states, or the like of one or a plurality of vehicles. The server device 500 is, for example, a single information processing device. The server device 500 may also be a cloud server including one or more information processing devices.

For example, the ride seeker determination unit 170 determines that a person P4 recognized by the external environment recognition unit 121 is a ride seeker, for example, upon receiving a notification including information indicating a ride seeker from the terminal device 400-1 of the person P4 outside the vehicle. In the example of FIG. 7, the person P4 uses the terminal device 400-1 to output a signal indicating that he or she is a ride seeker to a surrounding area. The surrounding area is a communication range defined by a communication standard. The vehicle M receives a signal from the terminal device 400-1 through the communication device 20. The ride seeker determination unit 170 recognizes the person near the vehicle M by the external environment recognition unit 121 on the basis of the signal received from the terminal device 400-1 and determines that the person P4 is a ride seeker.

The ride seeker determination unit 170 also determines that a person recognized by the external environment recognition unit 121 is a ride seeker upon receiving a notification including information indicating a ride seeker from a terminal device 400-2 indirectly via the server device 500. In the example of FIG. 7, the person P5 uses the terminal device 400-2 to transmit both information indicating that he or she is a ride seeker and position information of the terminal device 400-2 to the server device 500 via the network NW. On the basis of the information received from the terminal device 400-2, the server device 500 extracts the vehicle M that is traveling nearest to the position of the terminal device 400-2 and transmits both the information indicating that he or she is a ride seeker and the position information of the terminal device 400-2 to the extracted vehicle M. On the basis of the information received from the server device 500, the ride seeker determination unit 170 determines that the person P5 who is near the position of the terminal device 400-2 is a ride seeker.

The ride seeker determination unit 170 may also analyze an image captured by the camera 10 and may determine that a person is a ride seeker upon determining that the person included in the captured image has raised his or her hand. In the example of FIG. 7, the person P6 has raised his or her hand. Therefore, the ride seeker determination unit 170 determines that the person P6 is a ride seeker through analysis of the image captured by the camera 10.

[Determination as to Whether or not a Ride Seeker is a Person Ineligible for Riding]

Upon determining that a person recognized by the external environment recognition unit 121 is a ride seeker, the ride seeker determination unit 170 may further determine whether or not the ride seeker is a person ineligible for riding from the personal information.

For example, the ride seeker determination unit 170 analyzes an image captured by the camera 10 and determines that the ride seeker is accompanied by a pet when the captured image includes a contour shape of a pet such as a dog or a cat, feature information of a face of a pet, or the like in the vicinity of the ride seeker. Here, when the ride seeker determination unit 170 has determined that the ride seeker is accompanied by a pet such as a dog or a cat and the rider refuses to pick up a person accompanied by a pet, the ride seeker determination unit 170 determines that the ride seeker is ineligible for riding.

In addition, the ride seeker determination unit 170 may analyze the image captured by the camera 10 and may determine that the ride seeker is drunk when the motion of the ride seeker is shaky and unnatural and his or her face is red. In the case in which the vehicle sensors 70 include an alcohol detection sensor, the ride seeker determination unit 170 may determine the drunkenness on the basis of a result of detection of a breath exhaled by the ride seeker by the alcohol detection sensor. Upon determining that the ride seeker is drunk, the ride seeker determination unit 170 may determine that the ride seeker is a person ineligible for riding.

The ride seeker determination unit 170 may also analyze the image captured by the camera 10 and may determine that the ride seeker is a smoker upon determining that the ride seeker has a cigarette or is smoking a cigarette. In the case in which the vehicle sensors 70 include an odor detection sensor, the ride seeker determination unit 170 may determine whether or not the ride seeker is a smoker on the basis of a result of detection of a breath exhaled by the ride seeker by the odor detection sensor. When the ride seeker determination unit 170 has determined that the ride seeker is a smoker and the rider refuses to pick up a smoker, the ride seeker determination unit 170 may determine that the ride seeker is a person ineligible for riding.

Further, the ride seeker determination unit 170 may analyze the image captured by the camera 10 and may determine that the ride seeker is ineligible for riding upon determining that the ride seeker is a dangerous person such as one with a weapon or the like.

In addition, the ride seeker determination unit 170 may previously store personal information of a person with whom the rider does not wish to share a ride and may determine that the ride seeker is a person ineligible for riding when the ride seeker satisfies the stored condition. The interface control unit 160 may also display an inquiry screen on the touch panel of the in-vehicle device 31 when the rider gets in the vehicle or when personal information of the ride seeker is acquired and may acquire personal information of a person with whom the rider does not wish to share a ride from an answer to the inquiry.

Figure 8:
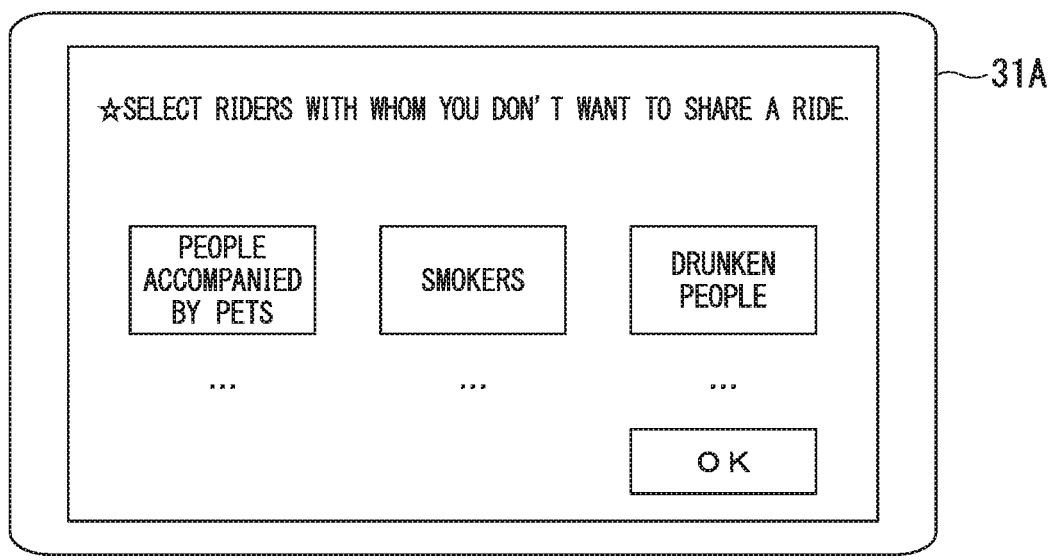
FIG. 8 is a diagram showing an example of an inquiry screen displayed at the time of a rider getting in the vehicle.

FIG. 8 is a diagram showing an example of an inquiry screen displayed at the time of a rider getting in the vehicle. An exemplary screen displayed on a touch panel 31A of the in-vehicle device 31 is shown in the example of FIG. 8. The touch panel 31A is installed, for example, at a predetermined position in front of each seat in the vehicle M. Using the touch panel 31A, the interface control unit 160 displays a screen allowing a rider of the vehicle M to select personal information of a person with whom the rider does not wish to share a ride from preset personal information items. In the example of FIG. 8, graphical user interface (GUI) objects such as "person accompanied by a pet," "smoker," and "drunken person" are displayed on the screen of the touch panel 31A. The interface control unit 160 outputs personal information associated with at least one GUI object selected by the rider to the ride seeker determination unit 170. This allows the ride seeker determination unit 170 to determine whether or not the ride seeker is ineligible for riding.

In addition, when the ride seeker determination unit 170 has determined the personal information of the ride seeker, the interface control unit 160 may display an inquiry screen regarding personal information of the ride seeker on the touch panel 31A make an inquiry from the rider.

Figure 9:
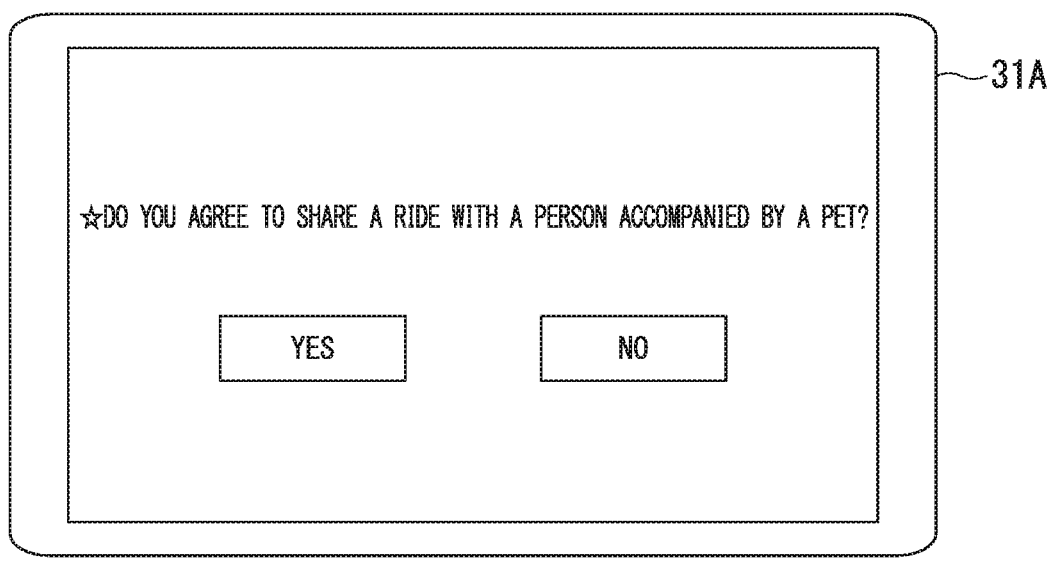
FIG. 9 is a diagram showing an example of an inquiry screen displayed when personal information has been determined.

FIG. 9 is a diagram showing an example of an inquiry screen displayed when personal information has been determined. The interface control unit 160 displays the personal information of the ride seeker to the rider of the vehicle M on the screen of the touch panel 31A and inquires the rider of the vehicle M as to whether or not to allow the determined person to ride. For example, when the ride seeker determination unit 170 has determined that the ride seeker is accompanied by a pet, the interface control unit 160 displays a screen asking whether or not to allow a person accompanied by a pet to take a shared ride on the touch panel 31A as shown in FIG. 9. The interface control unit 160 also displays GUI objects on the screen to accept or refuse riding of the ride seeker and outputs a result of selection by the rider to the ride seeker determination unit 170. This allows the ride seeker determination unit 170 to determine whether or not the ride seeker is ineligible for riding as described above.

In addition, the interface control unit 160 may audibly notify the rider of the same information as the information displayed on the screen through the speaker of the in-vehicle device 31 and may output an answer acquired from the microphone to the ride seeker determination unit 170. The interface control unit 160 may also notify the rider through a combination of the display on the screen and audio output.

Note that the interface control unit 160 may store information inquired once and may not repeat the same inquiry. The interface control unit 160 may also cause the server device 500 to manage information regarding a person with whom each rider does not wish to share a ride. In this case, the ride seeker determination unit 170 associates identification information of each rider such as a face authentication result or a rider ID with information regarding a person with whom the rider does not wish to share a ride and registers the identification information associated therewith in the server device 500 via the communication device 20. When a rider gets in the vehicle M, the interface control unit 160 acquires identification information of the rider, inquires of the server device 500 through the communication device 20, and acquires information regarding a person with whom the rider does not wish to share a ride from the server device 500.

When the ride seeker determination unit 170 has determined that the ride seeker is a person ineligible for riding, the interface control unit 160 performs control to refuse riding of a ride seeker. Specifically, for example, the interface control unit 160 performs door locking of the vehicle M or provides a notification of ride refusal or the like to the outside of the vehicle using both the vehicle exterior display 32 and the vehicle exterior speaker 33. This allows the ride seeker determination unit 170 to prevent the ineligible person from riding in the vehicle M.

[Stop Control]

Upon determining that the ride seeker is not a person ineligible for riding (i.e., is an eligible person), the ride seeker determination unit 170 outputs an instruction to stop the vehicle M in the vicinity of the person to the behavior plan generation unit 123. The behavior plan generation unit 123 generates a target trajectory for stopping according to the instruction from the ride seeker determination unit 170 and outputs the generated target trajectory to the travel control unit 141. This allows the vehicle M to stop in the vicinity of the ride seeker.

Further, when causing the vehicle M to stop, the interface control unit 160 may output information indicating that the vehicle M is going to stop to the outside of the vehicle using at least one of the vehicle exterior display 32 or the vehicle exterior speaker 33. The interface control unit 160 may also output information regarding a location (a scheduled stop position) at which the ride seeker is scheduled to be picked up to the outside of the vehicle using at least one of the vehicle exterior display 32 or the vehicle exterior speaker 33.

Figure 10:
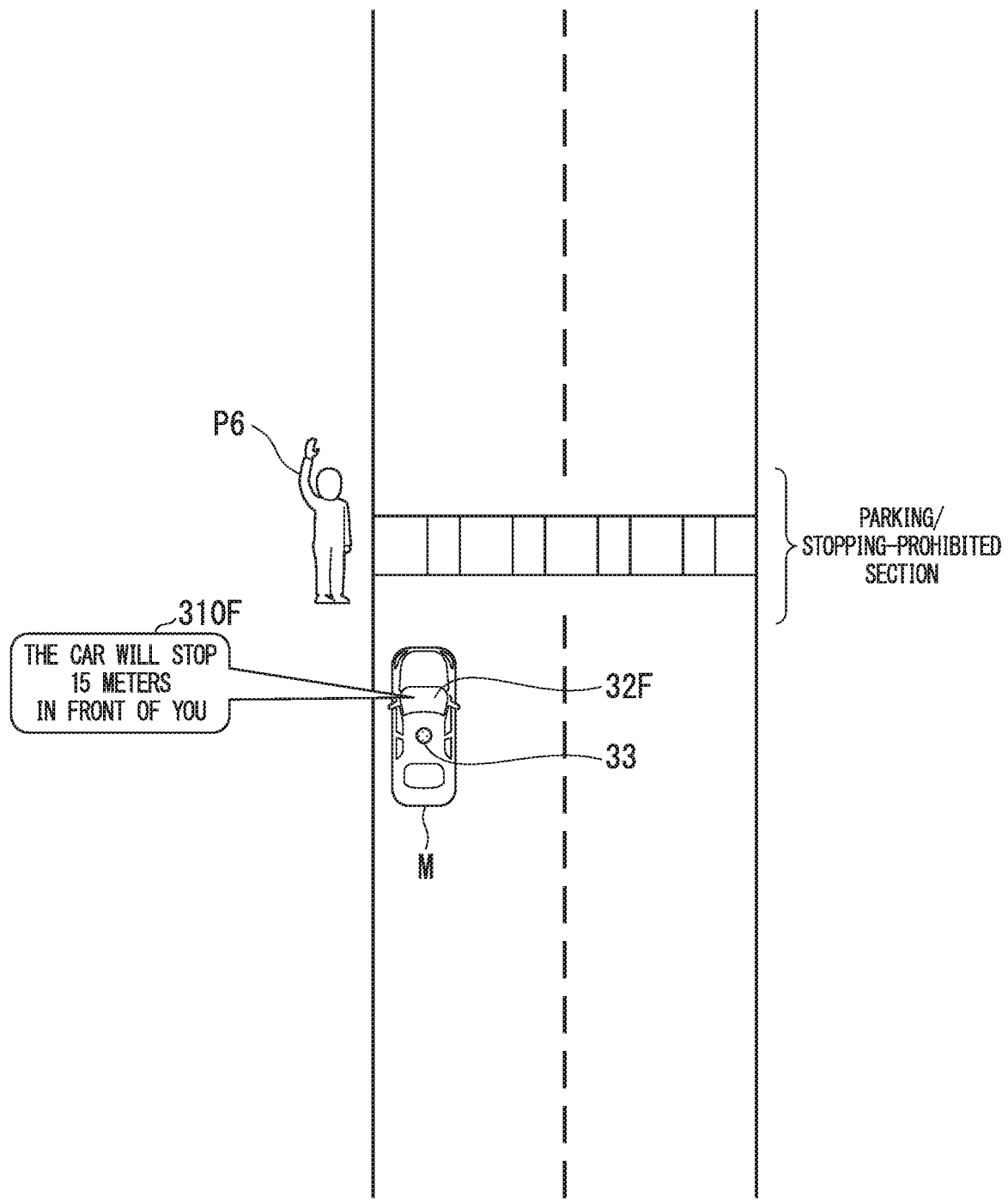
FIG. 10 is a diagram showing an example of information regarding a scheduled stop position that is output to the outside of the vehicle.

FIG. 10 is a diagram showing an example of information regarding the scheduled stop position that is output to the outside of the vehicle.

For example, the vehicle M cannot stop near a ride seeker when the ride seeker is in a parking/stopping-prohibited section such as in the vicinity of a pedestrian crossing or a bus stop. Therefore, the interface control unit 160 acquires a scheduled stop position on the basis of a target trajectory generated by the behavior plan generation unit 123 and presents information regarding the acquired scheduled stop position to the ride seeker using at least one of the vehicle exterior display 32 or the vehicle exterior speaker 33.

In the example of FIG. 10, a person P6 who has been determined to be a ride seeker by the ride seeker determination unit 170 is in the vicinity of a pedestrian crossing. In this case, the interface control unit 160 displays an image 310F regarding the scheduled stop position using the front display 32F. For example, the image 310F includes information such as "The car will stop 15 meters in front of you." This allows the person P6 to easily see that the vehicle M is going to stop to pick up him or her and to easily see the position at which the vehicle M will stop.

After picking up the person P6, the interface control unit 160 receives a destination of the person P6 using the in-vehicle device 31 and causes the behavior plan generation unit 123 to generate a behavior plan for stopping the vehicle M at the received destination of the person P6 when the received destination is a waypoint on a route of travel to a preset destination.

In addition, for example, when the vehicle M is performing following travel during travel to a destination, the interface control unit 160 may change both content which is displayed using the vehicle exterior display 32 and the display position of the content on the basis of a positional relationship between the vehicle M and another vehicle that the vehicle M travels behind.

Figure 11:
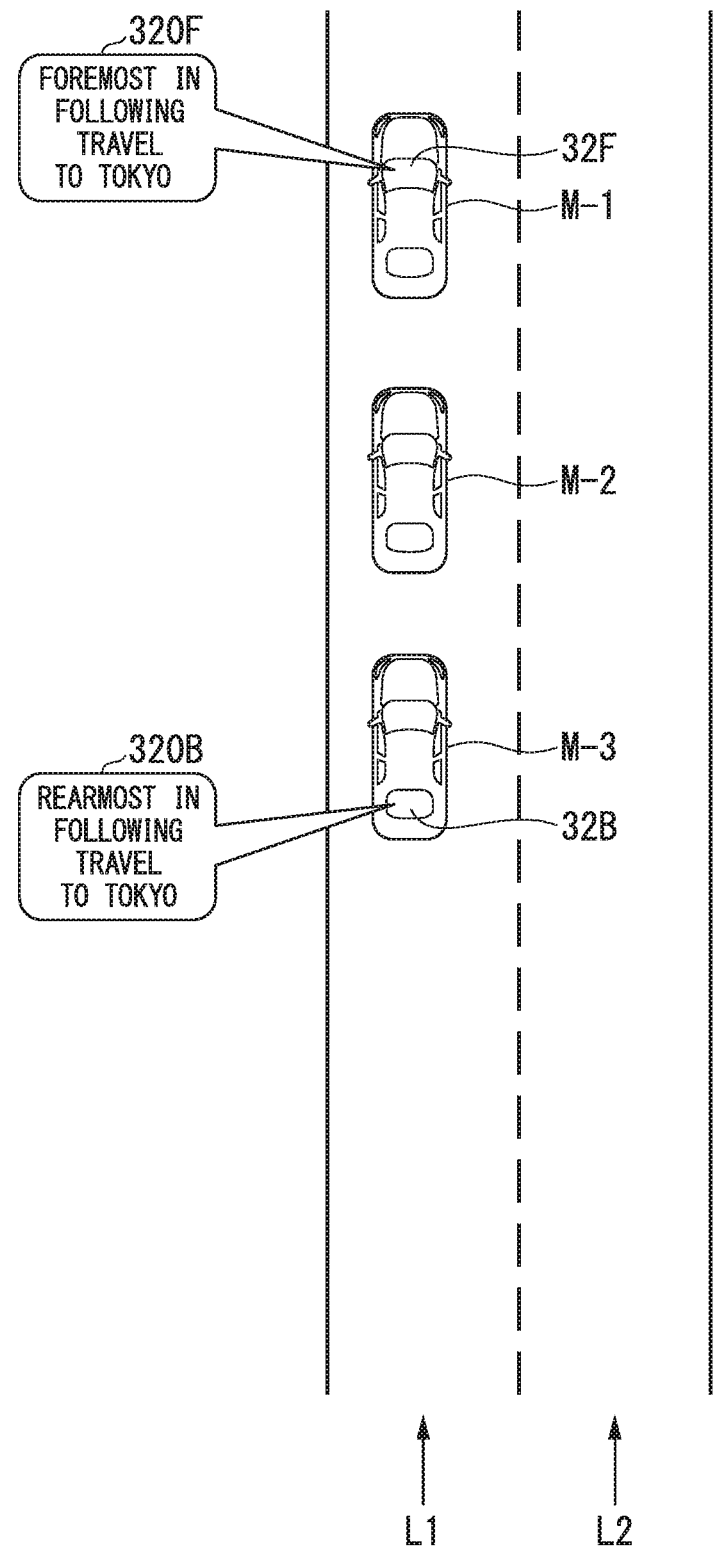
FIG. 11 is a diagram showing an example of information that is output to the outside of vehicles during a following travel.

FIG. 11 is a diagram showing an example of information that is output to the outside of vehicles during a following travel. In the example of FIG. 1, vehicles M-1 to M-3 are a series of vehicles performing a following travel. One of the vehicles M-1 to M-3 corresponds to the vehicle M described above.

The behavior plan generation unit 123 performs following travel event for causing the vehicle to follow a preceding vehicle when there is a preceding vehicle during travel. When following travel has started, the interface control unit 160 performs inter-vehicle communication with nearby vehicles using the communication device 20 to determine where the vehicle M is among the vehicles performing the following travel from information obtained from each of the nearby vehicles. When the vehicle M is the foremost or rearmost of the series of vehicles M-1 to M-3 performing the following travel, the interface control unit 160 outputs both information regarding the destination of the vehicle M and information regarding the following travel to the outside of the vehicle.

In the example of FIG. 11, when the vehicle M is the foremost (M-1) of the vehicles performing the following travel, the interface control unit 160 outputs an image 320F indicating the destination of the vehicle M and indicating that the vehicle M is the foremost vehicle in the following travel to the front display 32F. When the vehicle M is the rearmost (M-3) of the vehicles performing the following travel, the interface control unit 160 outputs an image 320B indicating the destination of the vehicle M and indicating that the vehicle M is the rearmost vehicle in the following travel to the rear display 32B.

This allows riders of nearby vehicles of the series of vehicles M-1 to M-3 to visually recognize both the destination of the series of vehicles and which are the foremost and rearmost of the series of vehicles performing a following travel. Therefore, it is possible to realize appropriate driving of a vehicle with an awareness of vehicles performing following travel when the vehicle is caused to travel following the rearmost of the vehicles or caused to overtake the vehicles.

[Rideshare Payment Processing]

In the case in which a plurality of people share a ride in the vehicle M, the rideshare payment processing unit 180 calculates the cost for each rider on the basis of conditions such as the number of people sharing a ride, a section traveled, a distance traveled, or actual expenses (fuel costs, expressway tolls). For example, the rideshare payment processing unit 180 divides the total amount by the number of people who have shared a ride, which allows each rider to reach the destination with less expense. The rideshare payment processing unit 180 may present a payment result or the like to each rider using the in-vehicle device 31 when the rider is dropped off.

The rideshare payment processing unit 180 may also calculate points for each rider who has shared a ride rather than calculating the amount of money. The calculated amount of money or points may be settled at the location or may be transmitted to the server device 500 shown in FIG. 7 via the communication device 20.

When the calculated amount of money or points has been transmitted to the server device 500, the server device 500 manages the amount of money or points for each rider. This allows the rider to settle the amount of money used for each month and to get benefits such as using the accumulated points when he or she shares a ride or exchanging the points for a product or the like.

[Vehicle Control Process]

Figure 12:
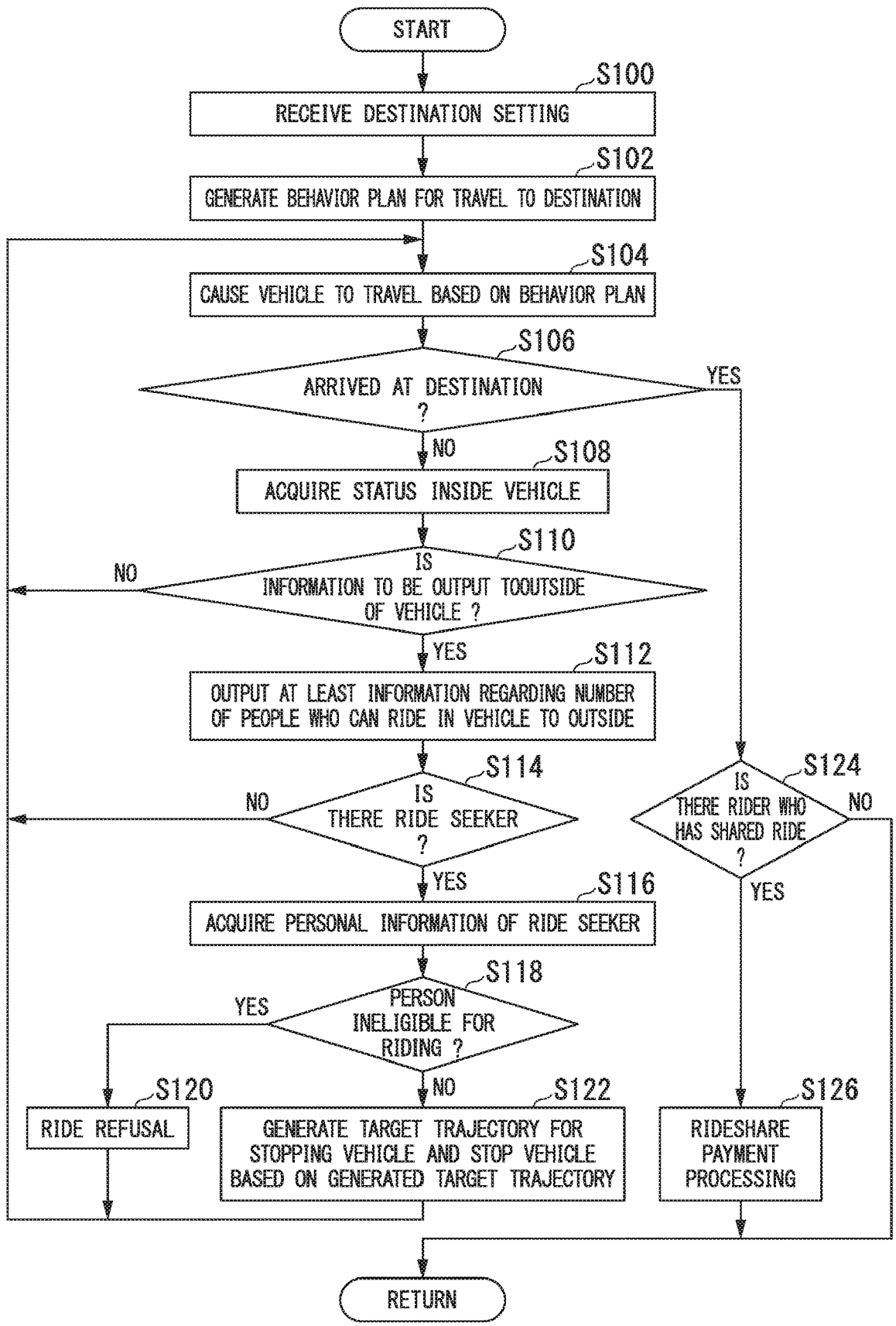
FIG. 12 is a flowchart showing an example of a vehicle control process according to the first embodiment.

Hereinafter, an example of various vehicle control by the vehicle system 1 of the first embodiment will be described. FIG. 12 is a flowchart showing an example of a vehicle control process according to the first embodiment. Vehicle control when rideshare driving is performed for a vehicle M with a rider already on board is described in the example shown in FIG. 12. The process of FIG. 12 is performed, for example, each time rideshare driving is performed.

First, the navigation device 50 receives a setting of the rider who is already on board (step S100). Next, the behavior plan generation unit 123 generates a behavior plan for the vehicle M to perform automated driving to a destination or the like (step S102). Next, the travel control unit 141 causes the vehicle M to travel on the basis of the generated behavior plan (step S104).

Next, the behavior plan generation unit 123 determines whether or not the vehicle M has arrived at the destination (step S106). If the vehicle has not arrived at the destination, the in-vehicle status acquisition unit 150 acquires a status inside the vehicle M (step S108). The status inside the vehicle M includes at least information regarding the number of people who can ride in the vehicle M.

Next, the interface control unit 160 determines whether or not information is to be output to the outside of the vehicle on the basis of predetermined conditions (step S110). Upon determining that information is to be output to the outside of the vehicle, the interface control unit 160 outputs at least information regarding the number of people who can ride in the vehicle using at least one of the vehicle exterior display 32 or the vehicle exterior speaker 33 (step S112).

Next, the ride seeker determination unit 170 determines whether or not there is a ride seeker (step S114). When there is a ride seeker, the ride seeker determination unit 170 acquires personal information of the ride seeker (step S116). Next, the ride seeker determination unit 170 determines whether or not the ride seeker is a person ineligible for riding (step S118). If the ride seeker is a person ineligible for riding, the interface control unit 160 performs control related to ride refusal (step S120) and the control process returns to the process of step S104. On the other hand, if the ride seeker is not a person ineligible for riding, the behavior plan generation unit 123 generates a target trajectory for stopping the vehicle and stops the vehicle M on the basis of the generated target trajectory (step S122) and the control process returns to the process of step S104 after picking up the ride seeker.

Upon determining in step S106 that the vehicle M has arrived at the destination, the rideshare payment processing unit 180 determines whether or not there is a rider who has shared a ride (step S124). When there is a rider who has shared a ride, the rideshare payment processing unit 180 performs a payment process for the rider (step S126). Then, this flowchart ends.

According to the first embodiment, the vehicle control system can easily realize ridesharing of the vehicle by outputting information as to whether or not it is possible to ride to the outside of the vehicle as described above. Specifically, according to the first embodiment, it is possible to allow people outside the vehicle to select vehicles in which they wish to ride by outputting information regarding the number of people who can ride in the vehicle, information regarding a travel schedule of the vehicle, information regarding in-vehicle equipment, information regarding the male-to-female ratio of riders, or the like. In addition, according to the first embodiment, it is possible to perform rideshare-related control within a predetermined section. It is also possible not to perform rideshare-related control when the vehicle travels on an expressway or the like, thereby realizing safe travel.

Further, according to the first embodiment, it is possible to allow riders of nearby vehicles to visually recognize the foremost and rearmost of a series of vehicles that are performing a following travel. Therefore, it is possible to realize appropriate driving of a vehicle when the vehicle is caused to travel following the rearmost of the vehicles or caused to overtake the vehicles.

Furthermore, according to the first embodiment, it is possible to easily identify a ride seeker by a notification made by a terminal device. According to the first embodiment, it is also possible to easily determine that a person is a ride seeker by his or her action of raising a hand.

In the first embodiment, a rider who first gets in the vehicle M sets a destination and rideshare pickup control is performed in automated driving to the destination. However, the present invention is not limited to this and rideshare pickup control may also be performed by unmanned driving. In this case, for example, a routine route is set in the vehicle M from the server device 500 and information regarding the routine route of the vehicle M is output using the vehicle exterior display 32 and the vehicle exterior speaker 33. Thus, the vehicle system 1 of the first embodiment can be applied, for example, to an unmanned taxi or an unmanned bus.

Second Embodiment

Next, a vehicle control system, a vehicle control method, and a vehicle control program according to a second embodiment will be described. In the second embodiment, it is assumed that the vehicle control system is applied to a vehicle which is not an automated driving vehicle. In the following description, the same constituent components as those of the first embodiment will be represented and denoted by the same constituent blocks and reference numerals and a detailed description thereof will be omitted here.

[Overall Configuration]

Figure 13:
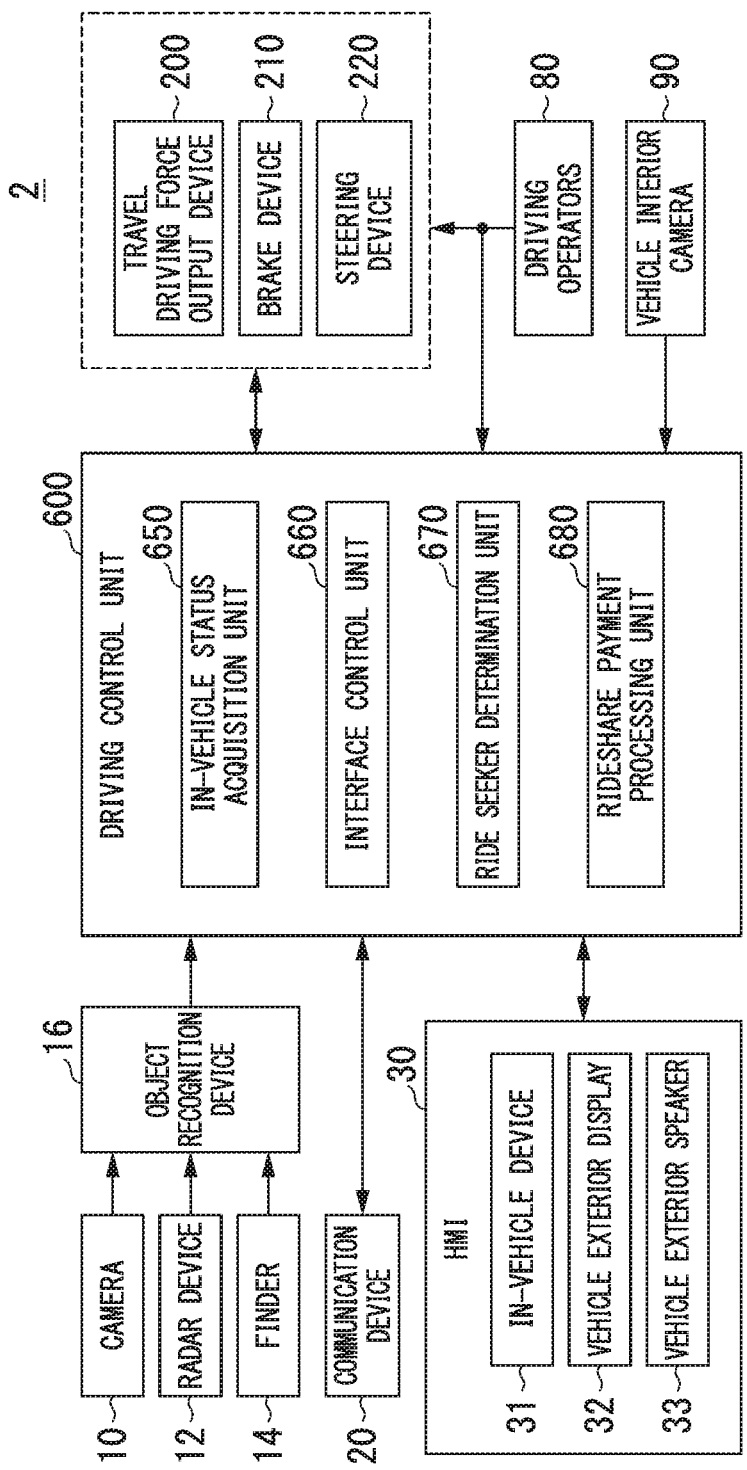
FIG. 13 is a configuration diagram of a vehicle system 2 according to a second embodiment.

FIG. 13 is a configuration diagram of a vehicle system 2 according to the second embodiment. The vehicle system 2 includes a camera 10, a radar device 12, a finder 14, an object recognition device 16, a communication device 20, an HMI 30, driving operators 80, a vehicle interior camera 90, a driving control unit 600, a travel driving force output device 200, a brake device 210, and a steering device 220. These devices or apparatuses are connected to each other by a multiplex communication line or a serial communication line such as a controller area network (CAN) communication line, a wireless communication network, or the like. Note that the components shown in FIG. 13 are merely an example and some of the components may be omitted or other components may be added.

In the second embodiment, the "vehicle control system" includes, for example, the HMI 30 and the driving control unit 600.

[Driving Control Unit]

The driving control unit 600 includes, for example, an in-vehicle status acquisition unit 650, an interface control unit 660, a ride seeker determination unit 670, and a rideshare payment processing unit 680. Each of the in-vehicle status acquisition unit 650, the interface control unit 660, the ride seeker determination unit 670, and the rideshare payment processing unit 680 is realized by a processor such as a CPU executing a program (software). Some or all of the respective functional units of the in-vehicle status acquisition unit 650, the interface control unit 660, the ride seeker determination unit 670, and the rideshare payment processing unit 680 may be realized by hardware such as an LSI, an ASIC, or an FPGA or may be realized by cooperation of hardware and software.

The in-vehicle status acquisition unit 650, the interface control unit 660, the ride seeker determination unit 670, and the rideshare payment processing unit 680 correspond respectively to the in-vehicle status acquisition unit 150, the interface control unit 160, the ride seeker determination unit 170, and the rideshare payment processing unit 180.

[Vehicle Control Process]

Figure 14:
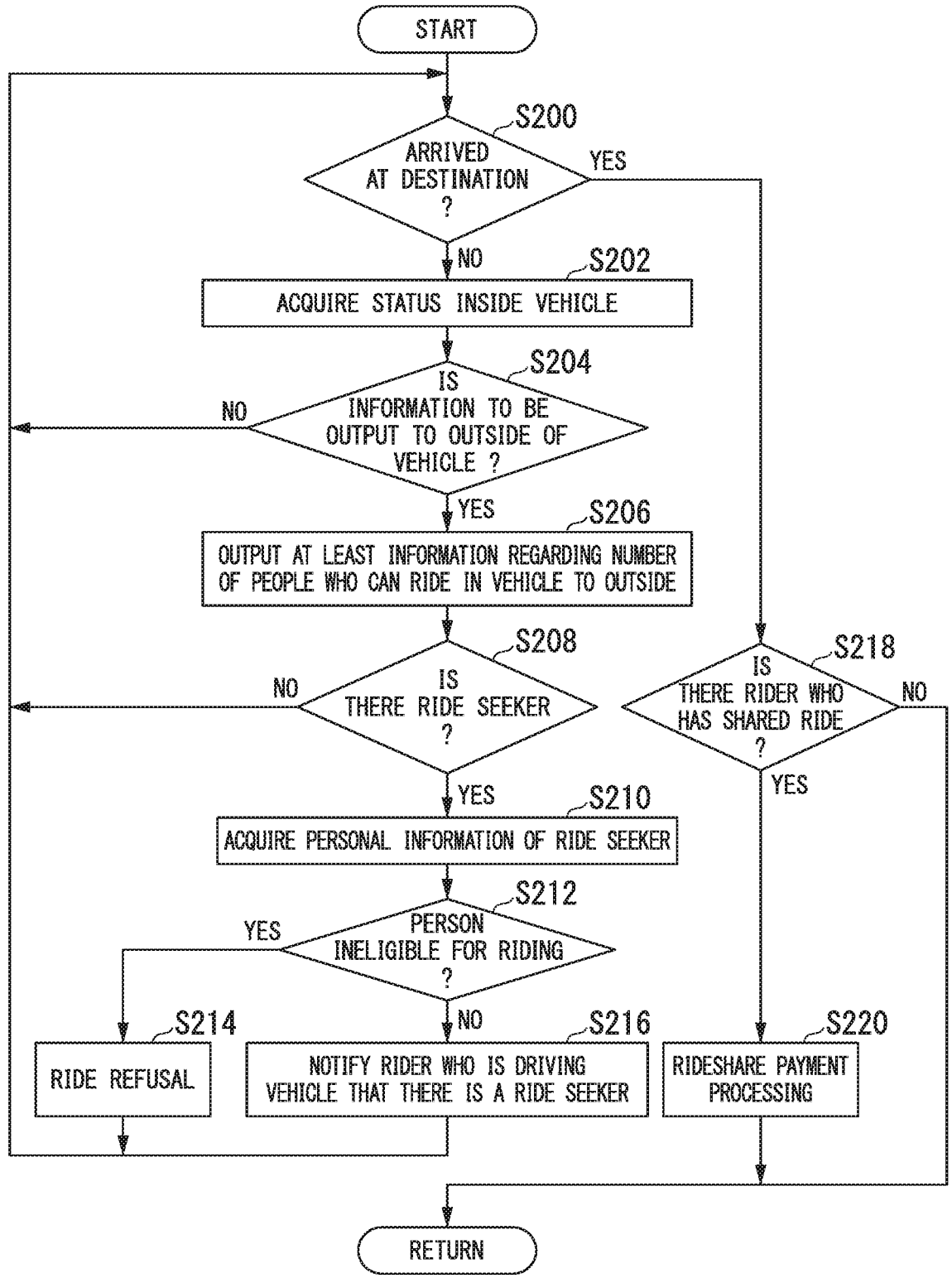
FIG. 14 is a flowchart showing an example of a vehicle control process according to the second embodiment.

Hereinafter, an example of various vehicle control by the vehicle system 2 of the second embodiment will be described. FIG. 14 is a flowchart showing an example of a vehicle control process according to the second embodiment. Vehicle control when rideshare driving is performed for a vehicle M which is already traveling to the destination by a rider's driving is described in the example shown in FIG. 14. The process of FIG. 14 is performed, for example, each time rideshare driving is performed.

First, the driving control unit 600 determines whether or not the vehicle M has arrived at the destination (step S200). If the vehicle has not arrived at the destination, the in-vehicle status acquisition unit 650 acquires a status inside the vehicle M (step S202).

Next, the interface control unit 660 determines whether or not information is to be output to the outside of the vehicle on the basis of predetermined conditions (step S204). Upon determining that information is to be output to the outside of the vehicle, the interface control unit 660 outputs at least information regarding the number of people who can ride in the vehicle using at least one of the vehicle exterior display 32 or the vehicle exterior speaker 33 (step S206).

Next, the ride seeker determination unit 670 determines whether or not there is a ride seeker (step S208). When there is a ride seeker, the ride seeker determination unit 670 acquires personal information of the ride seeker (step S210). Next, the ride seeker determination unit 670 determines whether or not the ride seeker is a person ineligible for riding (step S212). If the ride seeker is a person ineligible for riding, the interface control unit 660 performs control related to ride refusal (step S214) and the control process returns to the process of step S200. On the other hand, if the ride seeker is not a person ineligible for riding, the interface control unit 660 notifies the rider who is driving the vehicle M that there is a ride seeker using the in-vehicle device 31 (step S216). In this case, for example, the interface control unit 660 may output an alarm through a speaker or may output information indicating that there is a ride seeker to a display device. This allows the rider to drive and stop the vehicle M at the location of the ride seeker. The control process returns to the process of step S200 after picking up the ride seeker.

Upon determining in step S200 that the vehicle M has arrived at the destination, the rideshare payment processing unit 680 determines whether or not there is a rider who has shared a ride (step S218). When there is a rider who has shared a ride, the rideshare payment processing unit 680 performs a payment process for the rider (step S220). Then, this flowchart ends.

According to the second embodiment, the vehicle control system can easily realize ridesharing of vehicles for manual driving as described above. Thus, the vehicle system 2 of the second embodiment can be applied to, for example, a taxi, a bus, or the like in which a driver is present.

Although the mode for practicing the present invention has been described by way of embodiments, the present invention is not limited to these embodiments and various modifications and substitutions may be made without departing from the spirit of the present invention.

What is claimed is:

1. A vehicle control system comprising:
a processor configured to:
output information to an outside of a vehicle;
acquire a status inside the vehicle; and
perform control as to whether or not to output information, which is as to whether or not it is possible to ride in the vehicle based on in-vehicle information, based on a traveling speed of the vehicle.

2. The vehicle control system according to claim 1, wherein the processor is configured to acquire a number of riders as the in-vehicle information and to cause the processor to output at least information regarding a number of people who can ride in the vehicle.

3. The vehicle control system according to claim 2, wherein the processor is configured to output, together with the information regarding the number of people who can ride in the vehicle, at least one of information regarding a travel plan of the vehicle or information regarding in-vehicle equipment or a male-to-female ratio of riders.

4. The vehicle control system according to claim 3, wherein the information regarding the travel plan of the vehicle includes at least one of a destination of the vehicle or a waypoint on a route of travel to the destination.

5. The vehicle control system according to claim 1, wherein the processor is configured to output information regarding a location at which a person is scheduled to be picked up by the vehicle.

6. The vehicle control system according to claim 1, wherein the processor is configured to output information as to whether or not it is possible to ride in the vehicle when the vehicle is traveling within a predetermined section.

7. The vehicle control system according to claim 3, wherein the processor is configured to output information regarding the travel plan of the vehicle when it is determined the vehicle is performing a following travel and is a foremost or rearmost vehicle.

8. A vehicle control system, comprising:
a processor configured to:
output information to an outside of the vehicle;
acquire a status inside the vehicle;
output information as to whether or not it is possible to ride in the vehicle based on in-vehicle information; and
recognize a person near the vehicle,
wherein the processor is configured to control a display speed of the information as to whether or not it is possible to ride in the vehicle based on a walking speed of the person, and to output the information.

9. The vehicle control system according to claim 8, wherein the processor is further configured to:
control traveling of the vehicle; and
determine whether or not the person is a ride seeker, and decrease a traveling speed of the vehicle when it has been determined that the person is a ride seeker.

10. The vehicle control system according to claim 9, wherein the processor is configured to determine that the person is a ride seeker upon receiving, from a terminal device, a notification including information indicating that the person is a ride seeker.

11. The vehicle control system according to claim 9, further comprising an image capturing device configured to capture an image around the vehicle,
wherein the processor is configured to analyze the image captured by the image capturing device and to determine that the person is a ride seeker when a person included in the captured image is recognized as having raised a hand.

12. The vehicle control system according to claim 9, wherein the processor is configured to refuse riding of the person when it has been determined that the person is ineligible for riding or when a rider of the vehicle has determined that the person is ineligible for riding.

13. The vehicle control system according to claim 1, further comprising:
wherein the processor is further configured to:
perform automated driving of the vehicle and output information regarding a travel plan of the vehicle.

14. A vehicle control method comprising:
acquiring, by a vehicle-mounted computer, a status inside a vehicle; and outputting, by the vehicle-mounted computer, information as to whether it is possible to ride in the vehicle to an outside of the vehicle based on acquired in-vehicle information and a walking speed of of a person recognized as being outside the vehicle.

15. A non-transitory computer readable media comprising a vehicle control program causing a vehicle-mounted computer to:

acquire a status inside a vehicle; and outputting information as to whether it is possible to ride in the vehicle to an outside of the vehicle based on acquired in-vehicle information and a walking speed of a person recognized as being outside the vehicle.

16. The vehicle control system according to claim 1, wherein the processor is further configure to:

perform automated driving of the vehicle, and output information as to whether or not it is possible to ride in the vehicle based on the in-vehicle information.

17. The vehicle control system according to claim 16, wherein the processor is further configured to:

recognize a person near the vehicle;

determine whether or not the person recognized is a ride seeker; and decreased a traveling speed of the vehicle when it has been determined that the person is a ride seeker.

* * * * *